(12) United States Patent
Palmer et al.

(10) Patent No.: US 8,986,002 B2
(45) Date of Patent: Mar. 24, 2015

(54) APPARATUS FOR COMBUSTING A FUEL AT HIGH PRESSURE AND HIGH TEMPERATURE, AND ASSOCIATED SYSTEM

(75) Inventors: Miles R. Palmer, Chapel Hill, NC (US); Rodney John Allam, Chippenham (GB); Glenn William Brown, Jr., Durham, NC (US); Jeremy Eron Fetvedt, Raleigh, NC (US)

(73) Assignees: 8 Rivers Capital, LLC, Durham, NC (US); Palmer Labs, LLC, Durham, NC (US)

( * ) Notice: Subject to any disclaimer, the term of this patent is extended or adjusted under 35 U.S.C. 154(b) by 0 days.

(21) Appl. No.: 13/220,439

(22) Filed: Aug. 29, 2011

(65) Prior Publication Data

US 2012/0073261 A1    Mar. 29, 2012

Related U.S. Application Data

(63) Continuation-in-part of application No. 12/872,364, filed on Aug. 31, 2010, which is a continuation-in-part of application No. 12/714,074, filed on Feb. 26, 2010.

(60) Provisional application No. 61/155,755, filed on Feb. 26, 2009, provisional application No. 61/299,272, filed on Jan. 28, 2010, provisional application No. 61/510,356, filed on Jul. 21, 2011.

(51) Int. Cl.
*F23C 7/00* (2006.01)
*F23L 7/00* (2006.01)
(Continued)

(52) U.S. Cl.
CPC ............... *F23L 7/00* (2013.01); *F23J 15/027* (2013.01); *F23L 7/007* (2013.01); *F23M 5/085* (2013.01);
(Continued)

(58) Field of Classification Search
CPC ........... F23G 7/065; B01D 53/34; B01J 19/00
USPC .................................. 431/350, 351, 352, 353
See application file for complete search history.

(56) References Cited

U.S. PATENT DOCUMENTS 2,658,332 A     11/1953   Nicholson
2,660,521 A *  11/1953   Teichmann ................. 48/198.3
(Continued)

FOREIGN PATENT DOCUMENTS

DE          3514974 A1     10/1986
DE          3519159 A1     12/1986
(Continued)

*Primary Examiner* — Kenneth Rinehart
*Assistant Examiner* — Gajanan M Prabhu
(74) *Attorney, Agent, or Firm* — Womble Carlyle Sandridge & Rice, LLP

(57) ABSTRACT

A combustor apparatus is provided, comprising a mixing arrangement for mixing a carbonaceous fuel with enriched oxygen and a working fluid to form a fuel mixture. A combustion chamber is at least partially defined by a porous perimetric transpiration member, at least partially surrounded by a pressure containment member. The combustion chamber has longitudinally spaced apart inlet and outlet portions. The fuel mixture is received by the inlet portion for combustion within the combustion chamber at a combustion temperature to form a combustion product. The combustion chamber directs the combustion product longitudinally toward the outlet portion. The transpiration member is configured to substantially uniformly direct a transpiration substance therethrough toward the combustion chamber, such that the transpiration substance is directed to flow helically about the perimeter and longitudinally between the inlet and outlet portions, for buffering interaction between the combustion product and the transpiration member. Associated systems are also provided.

23 Claims, 11 Drawing Sheets

(51) Int. Cl.
*F23J 15/02* (2006.01)
*F23M 5/08* (2006.01)

(52) U.S. Cl.
CPC ............... *F23C 2900/03004* (2013.01); *F23L 2900/07002* (2013.01); *F23M 2900/05004* (2013.01); *Y02E 20/322* (2013.01); *Y02E 20/344* (2013.01)
USPC ............ 431/353; 431/350; 431/351; 431/352

(56) References Cited

U.S. PATENT DOCUMENTS

| | | | |
|---|---|---|---|
| 3,399,022 A * | 8/1968 | Bailey | 431/116 |
| 3,420,631 A * | 1/1969 | Boyd | 423/456 |
| 3,623,711 A | 11/1971 | Thorstenson | |
| 3,793,861 A | 2/1974 | Burkhard et al. | |
| 3,857,921 A | 12/1974 | Tamura et al. | |
| 3,921,544 A | 11/1975 | Reese | |
| 3,976,443 A | 8/1976 | Paull et al. | |
| 4,268,765 A * | 5/1981 | Hoover, Jr. | 310/11 |
| 4,386,941 A | 6/1983 | Crouch et al. | |
| 4,572,082 A | 2/1986 | Ueda et al. | |
| 4,673,348 A | 6/1987 | Riley et al. | |
| 4,775,314 A | 10/1988 | Sternling | |
| 4,895,710 A | 1/1990 | Hartmann et al. | |
| 5,078,760 A | 1/1992 | Haldipur et al. | |
| 5,116,394 A | 5/1992 | Garkawe | |
| 5,167,932 A | 12/1992 | Ruottu | |
| 5,709,077 A | 1/1998 | Beichel | |
| 6,151,887 A | 11/2000 | Haidn et al. | |
| 6,234,787 B1 | 5/2001 | Endoh et al. | |
| RE37,300 E | 7/2001 | Nagato et al. | |
| 6,408,629 B1 * | 6/2002 | Harris et al. | 60/804 |
| 6,436,337 B1 | 8/2002 | Gross | |
| 6,497,118 B1 * | 12/2002 | Schermerhorn | 65/17.4 |
| 6,596,220 B2 | 7/2003 | Gross | |
| 6,606,851 B1 | 8/2003 | Herdy, Jr. et al. | |
| 6,617,003 B1 | 9/2003 | Lee et al. | |
| 6,862,877 B1 | 3/2005 | James | |
| 7,028,478 B2 | 4/2006 | Prentice, III | |
| 7,089,745 B2 | 8/2006 | Roby et al. | |
| 7,147,461 B2 | 12/2006 | Neary | |
| 7,186,091 B2 * | 3/2007 | Lee et al. | 416/231 R |
| 7,334,396 B2 * | 2/2008 | Erickson et al. | 60/259 |
| 7,516,620 B2 | 4/2009 | Patrick et al. | |
| 7,955,406 B2 * | 6/2011 | Smith | 55/346 |
| 8,671,658 B2 | 3/2014 | Prabhu | |
| 2004/0142294 A1 * | 7/2004 | Niass et al. | 431/278 |
| 2004/0219079 A1 | 11/2004 | Hagen et al. | |
| 2005/0135984 A1 * | 6/2005 | Ferron et al. | 423/245.3 |
| 2006/0037323 A1 * | 2/2006 | Reynolds et al. | 60/754 |
| 2007/0101722 A1 | 5/2007 | Hoffmann | |
| 2007/0240425 A1 | 10/2007 | Malavasi et al. | |
| 2007/0274876 A1 | 11/2007 | Chiu et al. | |
| 2008/0250772 A1 | 10/2008 | Becker et al. | |
| 2009/0255450 A1 | 10/2009 | Stone et al. | |
| 2010/0050517 A1 * | 3/2010 | Tsilevich | 48/127.1 |
| 2010/0300063 A1 | 12/2010 | Palmer et al. | |
| 2010/0307431 A1 | 12/2010 | Buchanan | |
| 2011/0056373 A1 * | 3/2011 | Baxter | 95/213 |
| 2012/0131925 A1 | 5/2012 | Mittricker et al. | |

FOREIGN PATENT DOCUMENTS

| | | |
|---|---|---|
| DE | 4443077 A1 | 6/1996 |
| DE | 4244921 C2 | 2/1998 |
| EP | 1 195 559 A2 | 4/2002 |
| JP | 10-121912 A | 5/1998 |
| RU | 2138661 C1 | 9/1999 |
| SU | 373488 A1 | 5/1973 |
| WO | WO 98/21522 A1 | 5/1998 |
| WO | WO 2005/114050 A1 | 12/2005 |
| WO | WO 2009/007356 A1 | 1/2009 |

\* cited by examiner

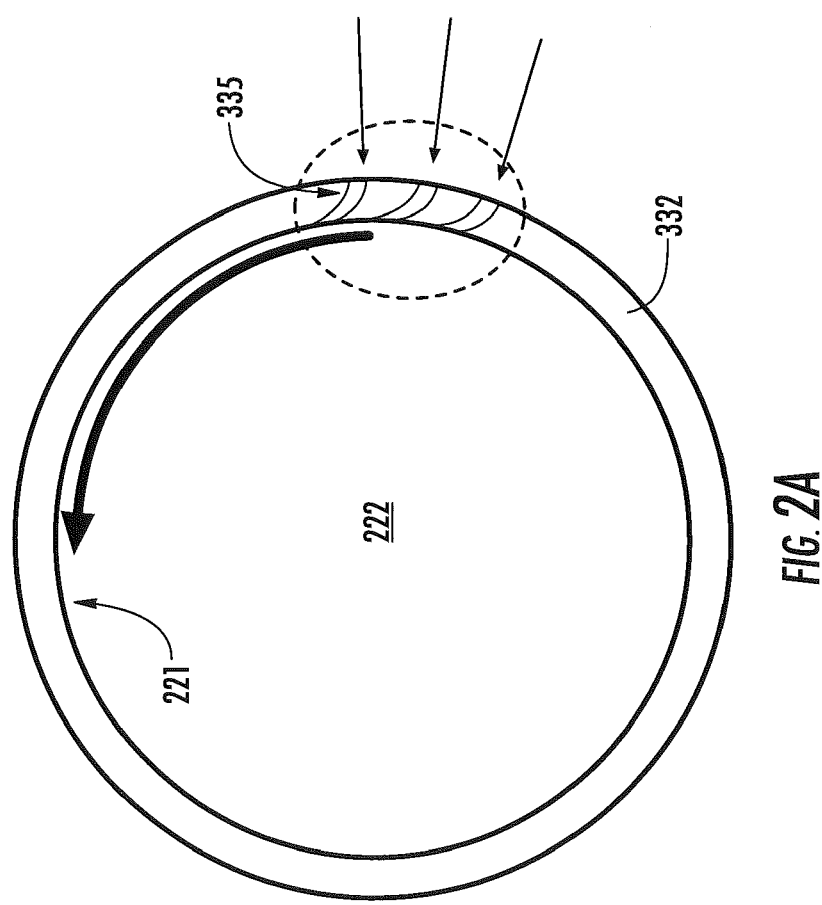
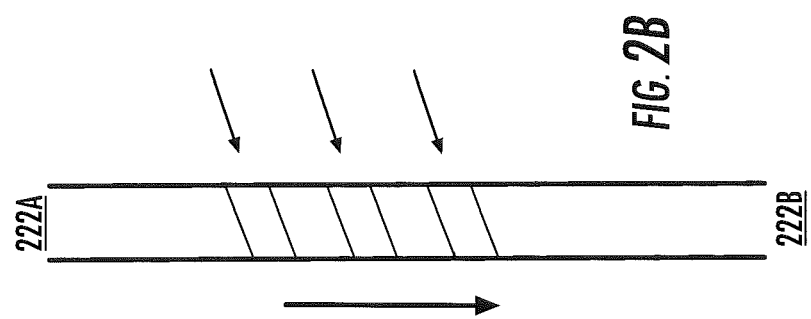

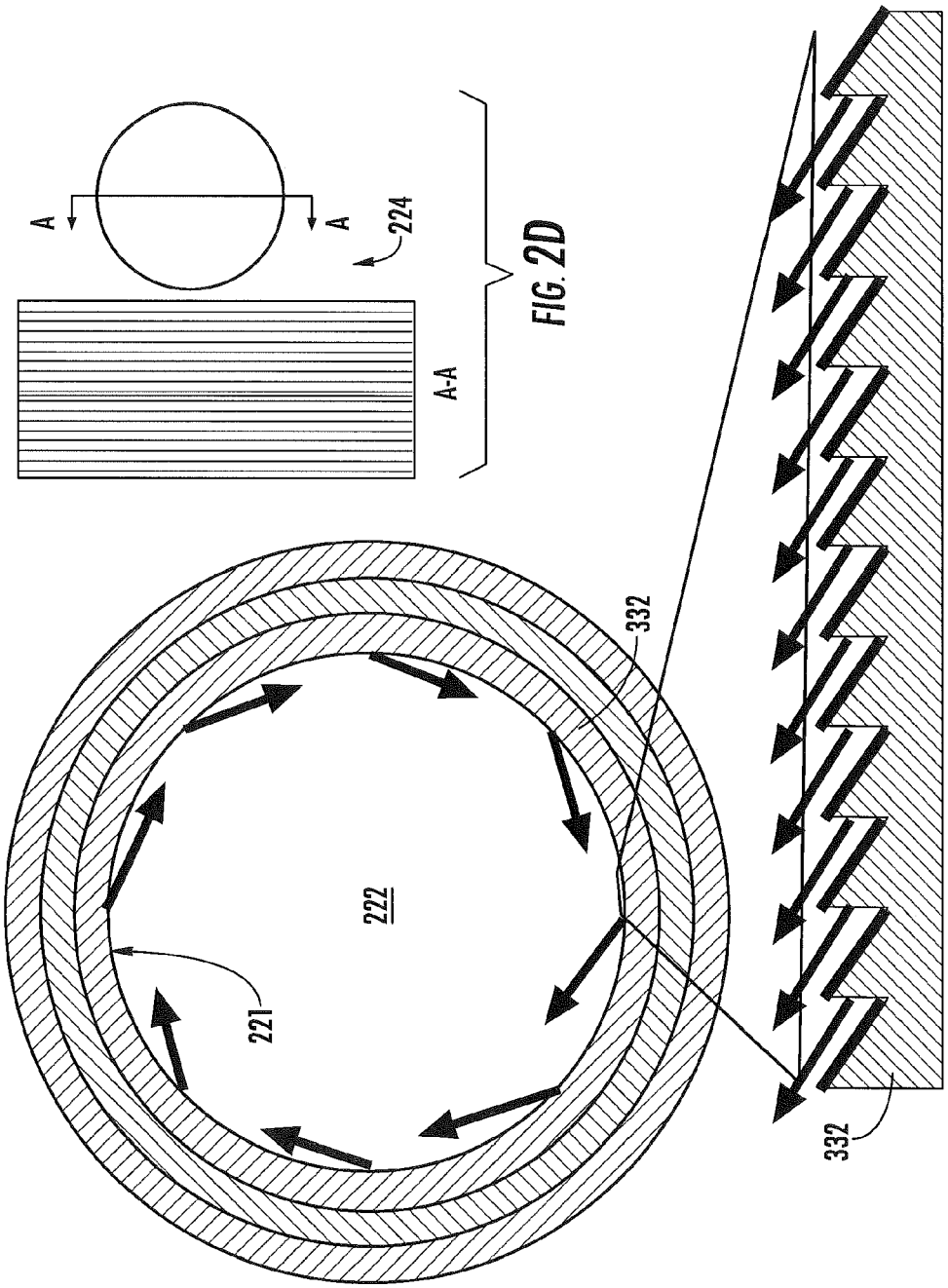

US 8,986,002 B2

APPARATUS FOR COMBUSTING A FUEL AT HIGH PRESSURE AND HIGH TEMPERATURE, AND ASSOCIATED SYSTEM

CROSS-REFERENCE TO RELATED APPLICATIONS

The present patent application is a continuation-in-part of U.S. patent application Ser. No. 12/872,364, filed Aug. 31, 2010, which is a continuation-in-part of U.S. patent application Ser. No. 12/714,074, filed Feb. 26, 2010, which claims priority to U.S. Provisional Patent Application No. 61/155,755, filed Feb. 26, 2009, and U.S. Provisional Patent Application No. 61/299,272, filed Jan. 28, 2010; and also claims priority to U.S. Provisional Patent Application No. 61/510,356, filed Jul. 21, 2011, the disclosures of which are all incorporated herein by reference in their entirety.

BACKGROUND OF THE DISCLOSURE

1. Field of the Disclosure

The present disclosure is directed to apparatuses and systems for the combustion of a carbonaceous fuel with oxygen at high pressure and high temperature to produce combustion products which are either oxidized with an excess of oxygen, or which contain reducing components and have zero oxygen content. One particular application would be for generation of energy, such as electricity, through the use of a working fluid to transfer energy generated through high efficiency combustion of a fuel. Particularly, such apparatuses and systems can use carbon dioxide or steam as the working fluid. In another aspect, the apparatuses and systems may be used to generate a gas containing hydrogen and/or carbon monoxide.

2. Description of Related Art

It is estimated that fossil fuels will continue to provide the bulk of the world's electric power requirements for the next 100 years, while non-carbon power sources are developed and deployed. Known methods of power generation through combustion of fossil fuels and/or suitable biomass, however, are plagued by rising energy costs and an increasing production of carbon dioxide ($CO_2$) and other emissions. Global warming is increasingly seen as a potentially catastrophic consequence of increased carbon emissions by the developed and developing nations. Solar and wind power do not appear capable of replacing fossil fuel combustion in the near term, and nuclear power has dangers associated with both proliferation and nuclear waste disposal.

Conventional arrangements for power production from fossil fuels or suitable biomass are now being increasingly burdened with a requirement for $CO_2$ capture at high pressure for delivery to sequestration sites. This requirement is proving difficult to fulfill, however, since present technology only provides for very low thermal efficiencies for even the best designs for $CO_2$ capture. Moreover, capital costs for achieving $CO_2$ capture are high, and may thus result in significantly higher electricity costs compared to systems that emit $CO_2$ into the atmosphere. Accordingly, there is an ever growing need in the art for apparatuses and methods for high efficiency power generation with a reduction in $CO_2$ emission and/or improved ease of capture and sequestration of produced $CO_2$.

Oxy-fuel combustion of carbonaceous fuels involves the separation of substantially pure oxygen from air (or otherwise providing such substantially pure oxygen for use in the combustion process) and using the oxygen as a combustion medium to produce combustion products which are substantially free of nitrogen and which comprise carbon dioxide and water vapor. Current art air and oxy-fuel combustors operate at limited temperatures and pressures to prevent excess-temperature damage to the combustor walls and/or to other system components, such as turbine blades. Limiting the operating temperature and/or pressure may, in some instances, undesirably lengthen the combustion process and/or require a relatively large combustion volume. In addition, the combustion process, the combustion design, and/or the downstream exhaust gas processing provisions may also be undesirably dependent on the type of fuel utilized for the process. Further, due to the large volumes of combustion gases applied to conventional boiler systems in the current art, and the exhaust of these gases to atmosphere, current methods of removing pollutants from exhaust smokestack gases and proposed oxy-fuel combustion systems are highly dependent on the detailed design of the plant and on the exact type of fuel burned in the plant. Each type of fuel has a contrasting chemical composition and amount of pollutants. Thus, current art undesirably requires that the exhaust gas scrubber systems or oxy-fuel combustion modifications for each plant be custom-designed specifically to accommodate a particular type of fuel with a particular chemical composition.

The current art for coal, as an example, generally utilizes a very large single combustor equipped with vertical tubular walls or helically-configured tubular walls in which steam at high pressure is generated and superheated in a separate superheater section. The large-size combustor may experience significant heat loss, and in general is subject to damage, as well as fouling of the burners, radiant and convective heat transfer surfaces and other components, from coal ash, slag and corrosive components, such as $SO_X$, HCl, $NO_X$, etc., in the combustion gases depending on the particular coal used. Such exemplary shortcomings may require that the entire plant be shut down to repair or replace damaged or corroded parts and/or other components at periodic intervals, and may thus result in lower availability of the plant and undesirable difficulties in compensating for the lost output of the plant during down times.

SUMMARY OF THE DISCLOSURE

The above and other needs are addressed by aspects of the present disclosure which, according to one particular aspect, provides an apparatus, such as a combustor apparatus, including a mixing arrangement configured to mix a carbonaceous fuel with enriched oxygen and a working fluid to form a fuel mixture. A combustor arrangement defines a combustion chamber having an inlet portion longitudinally spaced apart from an opposing outlet portion, wherein the inlet portion is configured to receive the fuel mixture for combustion within the combustion chamber at a combustion temperature to form a combustion product. The combustion chamber is further configured to direct the combustion product longitudinally toward the outlet portion. The combustor arrangement comprises a pressure containment member, and a porous perimetric transpiration member at least partially defining the combustion chamber, and being at least partially surrounded by the pressure containment member. The porous transpiration member is configured to substantially uniformly direct a transpiration substance therethrough toward the combustion chamber, such that the transpiration substance is directed to flow helically about the perimeter thereof and longitudinally between the inlet portion and the outlet portion, to buffer interaction between the combustion product and the porous transpiration member. In some instances, the flow of the transpiration substance may be directed into the combustion chamber by the porous transpiration member in a substantially uniform manner about the perimeter thereof and longitudinally between the inlet portion and the outlet portion, such that the transpiration substance is directed to flow substantially tangential to the perimeter of the porous transpiration member and helically thereabout. In addition, the transpiration substance may be introduced into the combustion chamber to achieve a desired outlet temperature of the combustion product. A transformation apparatus may be configured to receive the combustion product, wherein the transformation apparatus is responsive to the combustion product to transform thermal energy associated therewith into kinetic energy.

In another aspect, oxy-fuel combustion of carbonaceous fuels (and/or hydro-carbonaceous fuels) may also involve the separation of substantially pure oxygen from air (or otherwise providing such substantially pure oxygen) and its use as in the combustion process to produce combustion products which are substantially free of nitrogen and which comprise carbon dioxide and water vapor. The carbon dioxide-rich combustion product (following cooling and water condensation) may then be available for subsequent commercial use, such as for enhanced oil recovery or enhanced natural gas production or disposal in a suitable geological sequestration site (following compression and purification). Operation of an oxy-fuel power production system at high pressure may also allow the carbon dioxide derived from the fuel to be produced at a high pressure, resulting in power savings by reducing or eliminating the need to pressurize the carbon dioxide. Further, high pressure operation may allow the purified combustion products to be used directly in a power cycle, when mixed with a suitable heated working fluid such as $CO_2$ or steam. The operation of the power system at high pressure may also lead to reduced volumetric fluid flow rates in the power cycle, resulting in smaller equipment and lower capital costs. The high pressure oxy-fuel combustor with provision for temperature control is another important aspect. Cycling of a suitable fluid such as combustion product gas or carbon dioxide or liquid water or steam (such as from a recycle stream) through a transpiration-cooled and protected wall of the combustion chamber/space may also serve to control the combustion temperature. Flow of the transpiration substance through the combustion chamber walls may also serve to eliminate damage to and/or build-up on the chamber walls due to heat, or ash or liquid slag impingement effects. Thus, an efficient high pressure, high temperature combustor is provided which can be adapted to burn a variety of gaseous, liquid, or solid fuels or fuel mixtures to meet various requirements as part of a power system which can operate at significantly higher efficiencies and lower capital costs than present technology. In some instances, the combustor may be operated to produce a combustion product comprising hydrogen and carbon monoxide to be made available to downstream requirements, other than power production.

In still a further aspect, the present disclosure generally provides methods and apparatuses associated with a high pressure, high temperature, high efficiency, transpiring fluid-protected, oxy-fuel combustor for use, for example, in power generation, such as in combination with a power cycle using either $CO_2$ and/or $H_2O$ as a working fluid. In such an application, the combustor can be operated in an oxidizing mode, whereby the combustion products produced thereby contain an oxygen concentration in the range of between about 500 ppm and about 3% molar, and a carbon monoxide concentration below about 50 ppm, preferably below about 10 ppm molar. In another aspect, the combustor can be operated in a reducing mode whereby the combustion products produced thereby have near zero oxygen concentration and the combustion products contain a concentration of CO and $H_2$. Operation in the reducing mode can be configured to maximize the production of $H_2$ and CO, and to minimize the consumption of $O_2$. The reducing mode of operation may be beneficial not only for power production, but also for production of $H_2$ or $H_2$+CO synthesis gas. In particular aspects, the operating pressure may be in the range of between about 40 bar and about 500 bar, and preferably at least 80 bar, and the combustion product temperature may be generally in the range of between about 400° C. and about 3500° C.

In aspects involving power production, a portion of a working fluid is introduced into the combustor, along with the fuel and oxidant (i.e., enriched oxygen), for combustion, such that a high pressure, high temperature fluid stream (combustion product) is produced comprising the working fluid and the combustion products. The working fluid can be introduced through the transpiration-protected walls of the combustion chamber and/or through additional injection points about the combustion chamber. The working fluid, following the combustion process and mixing with the combustion products through transpiration, may have a temperature in a range suitable (i.e., low enough) for introduction directly into a power generation device, such as a turbine. In such instances, the total quantity of working fluid introduced into the combustor, as a diluent to the combustion products, may be adjusted to provide an exit temperature for the total working fluid stream leaving the combustor which is suitable for the operating inlet temperature and pressure of the power turbine. Advantageously, the fluid stream may be maintained at a relatively high pressure during expansion in the turbine such that the pressure ratio across the turbine (i.e., the ratio of the pressure at the inlet to the pressure at the outlet of the turbine) is less than about 12. The fluid stream can also be further processed to separate the components of the fluid stream, wherein such processing can include passing the fluid stream through a heat exchanger. In particular, the expanded working fluid (at least a portion of which may be recycled from the fluid stream) can be passed through the same heat exchanger to heat the high pressure working fluid prior to introduction of the same into the combustor. In certain aspects, the disclosure provides a high pressure oxy-fuel combustor for power production systems that can produce power at high efficiency with low capital cost and also can produce substantially pure $CO_2$ at pipeline pressure for commercial use or sequestration. The $CO_2$ also may be recycled into the power production system.

In other aspects, the disclosed combustion systems and methods may be configured to use a wide variety of fuel sources. For example, the high efficiency combustor according to the disclosure may use gaseous (e.g., natural gas or coal derived gases), liquid (e.g., hydrocarbons, bitumen) and/or solid (e.g., coal, lignite, pet-coke) fuels. Even other fuels, as otherwise described herein, could be used, such as algae, biomass, or any other suitable combustible organic materials.

In other aspects, the methods and systems of the present disclosure, when combined with power systems with $CO_2$ capture at pipeline pressure may be useful in that the combined system may exceed the best efficiency of current coal-fired steam cycle power stations that do not provide for the capture of $CO_2$. Such current power stations can provide, at best, for example, about 45% efficiency (L.H.V.) with 1.7 inches mercury condenser pressure using a bituminous coal. Aspects of the present system may exceed such efficiency, for example, while delivering $CO_2$ at 200 bar pressure.

In still another aspect, the present disclosure may provide the ability to reduce the physical size and capital cost of a power generation system compared to current technologies using a similar fuel. Thus, the methods and systems of the present disclosure can contribute to or otherwise facilitate significantly reduced construction costs associated with power production systems, and the relatively high efficiency of certain system combinations can lead to reduced costs of electricity or energy production, as well as reduced use of fossil fuels.

In one particular aspect, the present disclosure is directed to a method of power generation incorporating the use of a working fluid, such as $CO_2$ and/or $H_2O$. In some aspects, the method may comprise introducing heated, compressed $CO_2$ and/or superheated steam into a fuel combustor. Preferably, the $CO_2$ and/or steam can be introduced into a combustor operating at a pressure of at least about 80 bar. The $CO_2$ and/or $H_2O$ can be introduced into the combustor at two or more separate locations. Part of the $CO_2$ and/or $H_2O$ can be mixed with the $O_2$ and the solid, liquid, gaseous or supercritical fuel so that the combustion temperature within the combustion chamber can be determined based on the desired design value for the combustor. The rest of the heated $CO_2$ and/or superheated steam is then introduced into the combustion chamber to cool the combustion products by direct mixing therewith to achieve a desired total exit fluid stream temperature of between about 400° C. and about 3500° C., which may be required by the power production system. Under such conditions, the $CO_2$ and/or $H_2O$ can mix with combustion gases resulting from combustion of the fuel, with an oxidant such as oxygen at a purity greater than 85% molar, to produce a fluid stream comprising $CO_2$ and/or $H_2O$ at the desired temperature. In particular aspects, the exit fluid stream temperature may be in the range of between about 400° C. and about 3500° C. In other aspects, the exit fluid stream may be expanded across a turbine to generate power (i.e., generate electricity via the energy imparted to the turbine).

In certain aspects, it may be useful to heat the working fluid to an even greater temperature prior to introduction into the combustor. For example, the $CO_2$ and/or $H_2O$ may be heated to a temperature of at least about 200° C. to about 700° C. prior to introduction into the combustor. In other aspects, the $CO_2$ and/or $H_2O$ may be heated to a temperature of between about 700° C. and about 1000° C. prior to introduction into the combustor. In some aspects, such heating can be carried out using a heat exchanger arrangement. As further disclosed herein, the same heat exchanger may be used to cool the fluid stream exiting the power generation turbine.

Similarly, the combustor may be usefully operated at a higher pressure to produce a working fluid capable of achieving a very high efficiency in a power production cycle. For example, the combustor and the introduced portion of the working fluid $CO_2$ and/or $H_2O$ may be pressurized to at least about 200 bar. In other aspects, the pressure may be between about 200 bar and about 500 bar.

In certain aspects, the portion of the working fluid introduced into the combustor can be a recycled stream of substantially pure $CO_2$ so that any water content in the working fluid originates from the fuel. Of course, $CO_2$ from an external source could be used as the working fluid.

The fluid stream exiting from the combustor may comprise the $CO_2$ and/or $H_2O$ working fluid as well as one or more other components, such as products of combustion derived from the fuel or the combustion process. The exiting fluid stream can contain components such as $H_2O$, $SO_2$, $SO_3$, $NO$, $NO_2$, $Hg$, $HCl$ plus excess oxygen in the range of between about 300 ppm and about 3% molar. In other aspects, the exiting fluid stream can contain at least varying fractions of $H_2$ and CO and have substantially zero $O_2$ content.

The combustor may comprise an inlet nozzle arrangement through which the fuel plus the oxygen plus a portion of the working fluid is introduced into the combustor and where combustion is initiated and takes place in a stable manner, in either an oxidizing or reducing mode, over a desired fuel flow range, which is typically between about 50% and about 100% of design capacity. In certain aspects, the operating pressure may be above about 150 bar and, at this pressure, the oxygen can be introduced as a single phase mixture with $CO_2$ and a fuel such as natural gas, or a liquid such as a hydrocarbon distillate, to achieve a required adiabatic flame temperature. If the $CO_2$ at this high pressure is at a temperature below about 100° C., the density of the $CO_2$ is high enough to be used to support a significant fraction of powdered coal to form a slurry, wherein the slurry can then be pumped by a high pressure pump to the required combustion pressure and flow in a pipe, and to a mixing point where the supercritical mixture of $CO_2$ and oxygen is added to achieve a required adiabatic flame temperature in the combustor. The premixed fuel, diluent $CO_2$ and oxygen should desirably be at a combined temperature which is below the auto-ignition temperature of the system. The temperature of the $CO_2$ stream may be adjusted to meet this criterion. The inlet nozzle can comprise an array of holes in an injector plate, each of which will produce a fine jet of fluid resulting in rapid heat transfer and combustion, thereby producing a stable combustion zone. Hole sizes can be in the range of between about 0.5 mm and about 3 mm in diameter.

The walls of the combustion chamber may be lined with a layer of porous material through which is directed and flows a second part of the $CO_2$ and/or $H_2O$ diluent stream. The flow of fluid through this porous transpiration layer, and optionally through additional provisions, is configured to achieve the required total exit fluid stream outlet temperature of between about 400° C. and about 3500° C. This flow may also serve to cool the transpiration member to a temperature below the maximum allowable operational temperature of the material forming the transpiration member. The transpiration substance, such as the $CO_2$ and/or $H_2O$ diluent stream, may also serve to prevent impingement of any liquid or solid ash materials or other contaminants in the fuel which might corrode, foul, or otherwise damage the walls. In such instances, it may be desirable to use a material for the transpiration member with a reasonable (low) thermal conductivity so that incident radiant heat can be conducted radially outwards through the porous transpiration member and then be intercepted by convective heat transfer from the surfaces of the porous layer structure to the fluid passing radially inwards through the transpiration layer. Such a configuration may allow the subsequent part of the diluent stream directed through the transpiration member to be heated to a temperature in the range of between about 500° C. and about 1000° C., while simultaneously maintaining the temperature of the porous transpiration member within the design range of the material used therefor. Suitable materials for the porous transpiration member may include, for example, porous ceramics, refractory metal fiber mats, hole-drilled cylindrical sections, and/or sintered metal layers or sintered metal powders. A second function of the transpiration member may be to ensure a substantially even radially inward flow of diluents transpiration substance, as well as longitudinally along the combustor, to achieve good mixing between the second part of the diluent stream and the combustion product while promoting an even axial flow of along the length of the combustion chamber. A third function of the transpiration member is to achieve a velocity of diluent fluid radially inward so as to provide a buffer for or otherwise intercept solid and/or liquid particles of ash or other contaminants within the combustion products from impacting the surface of the transpiration layer and causing blockage or other damage. Such a factor may only be of importance, for example, when combusting a fuel, such as coal, having a residual inert non-combustible residue. The inner wall of the combustor pressure vessel surrounding the transpiration member may also be insulated to isolate the high temperature second diluent stream within the combustor.

Coal or other fuels with an incombustible residue may be introduced into the combustor as a slurry in water or, preferably, a slurry in liquid $CO_2$. The liquid portion of the slurry leaves the power system at near ambient temperature and at the lowest pressure in the power cycle. The difference in enthalpy per mole between slurry inlet condition and the gas outlet condition, in such instances, may be about 10 kcal/gm-mol for $H_2O$ and about 2.78 kcal/gm-mol for $CO_2$, giving a significantly higher efficiency for a $CO_2$ slurrying fluid. Little additional energy is required in a high pressure power cycle with $CO_2$ as the working fluid to produce liquid $CO_2$ at temperatures in the range of between about $-30°$ C. and about $10°$ C.

The combustion temperature of fuels, generally solids such as coal, producing incombustible residue, is preferably in the range of between about $1800°$ C. and about $3000°$ C. In such conditions, the ash or other contaminants will be in the form of liquid slag droplets originating from the fuel particles in the slurry fuel feed. These liquid slag droplets must be removed efficiently in order to prevent contamination of the power turbine or other downstream processes. Removal may be accomplished, for example, using cyclone separators, impingement separators, or beds of graded refactory granular filters arranged in an annular configuration, or combinations thereof. In particular aspects, the droplets may be removed from the high temperature working fluid stream by a series of cyclone separators. To achieve efficient removal, there is preferably at least 2 and preferably 3 cyclone separators in series. The removal efficiency may be enhanced by a number of factors. For example, the removal temperature can be adjusted to ensure that the slag viscosity is low enough to remove a free draining liquid slag from the separators. It may sometimes be necessary to carry out the slag removal at an intermediate temperature, between the combustion temperature and the final exit fluid stream temperature. In such cases, the final exit fluid stream outlet temperature may be achieved by mixing a portion of the recycled working fluid (the transpiration substance) directly with the fluid stream leaving the slag removal system. The diameter of the cyclone separators should desirably be relatively low (i.e., in the range of between about 20 cm and about 50 cm in diameter), while the diameter of the slag droplets should be high enough to provide good separation efficiency. Such conditions may be achieved, for example, by grinding the coal fuel to achieve a high fraction of >50 microns particle diameter. The coal is preferably particulated to between about 50 microns and about 100 microns in average particle diameter, which may result in a minimal fraction of slag particles below 10 microns diameter being present in the exit working fluid flow. In some instances, the cyclone separators may be followed by an annular filter disposed immediately upstream of the turbine.

In particular aspects, a residence time for combustion products in the system may be in the range 0.2 second to 2 seconds for natural gas and 0.4 seconds to 4 seconds for a bituminous coal.

The fluid stream exiting the combustor may exhibit a variety of different characteristics. For example, the fluid stream may comprise an oxidizing fluid. As such, the fluid stream may comprise one or more components that may be rapidly oxidized (e.g., combusted) by the addition of an oxidant (e.g., $O_2$). In some aspects, the fluid stream may be a reducing fluid comprising one or more components selected from the group consisting of $H_2$, CO, $CH_4$, $H_2S$, and combinations thereof. Operation of the system in the reducing mode will be generally similar to the oxidizing mode except that the proportion of the secondary diluent will be progressively reduced as the fraction of fuel converted to $H_2$+CO increases. It may also be necessary to increase the average residence time for combustion products progressively to a range of between about 2.5 seconds and about 4.5 seconds for natural gas fuel, as the conversion to $H_2$+CO increases to the maximum, and between about 6 seconds and about 10 seconds for a bituminous coal.

The above and other aspects thus address the identified needs and provide advantages as otherwise detailed herein.

BRIEF DESCRIPTION OF THE DRAWINGS

Figure 1:
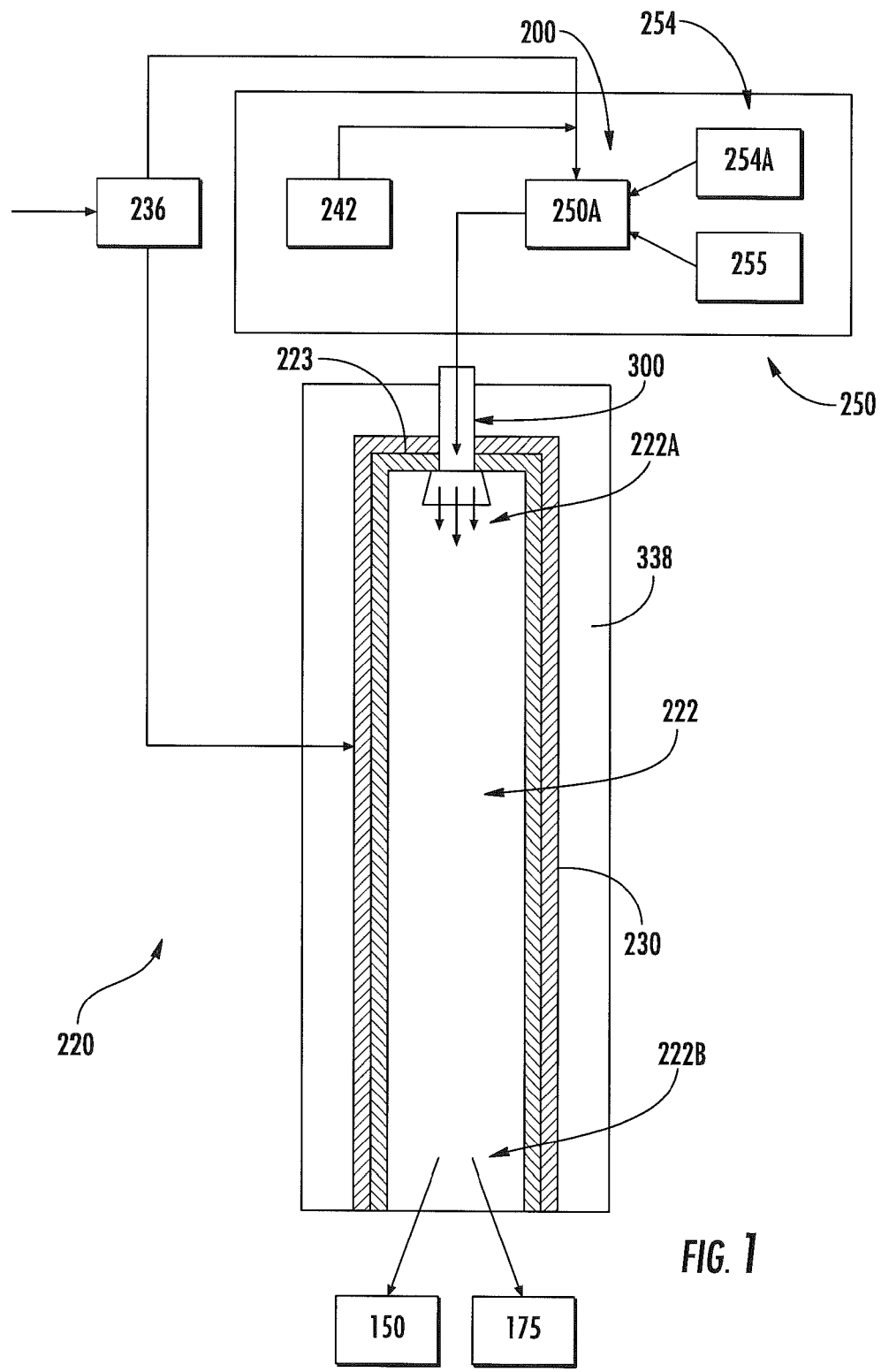
Figure 1A:
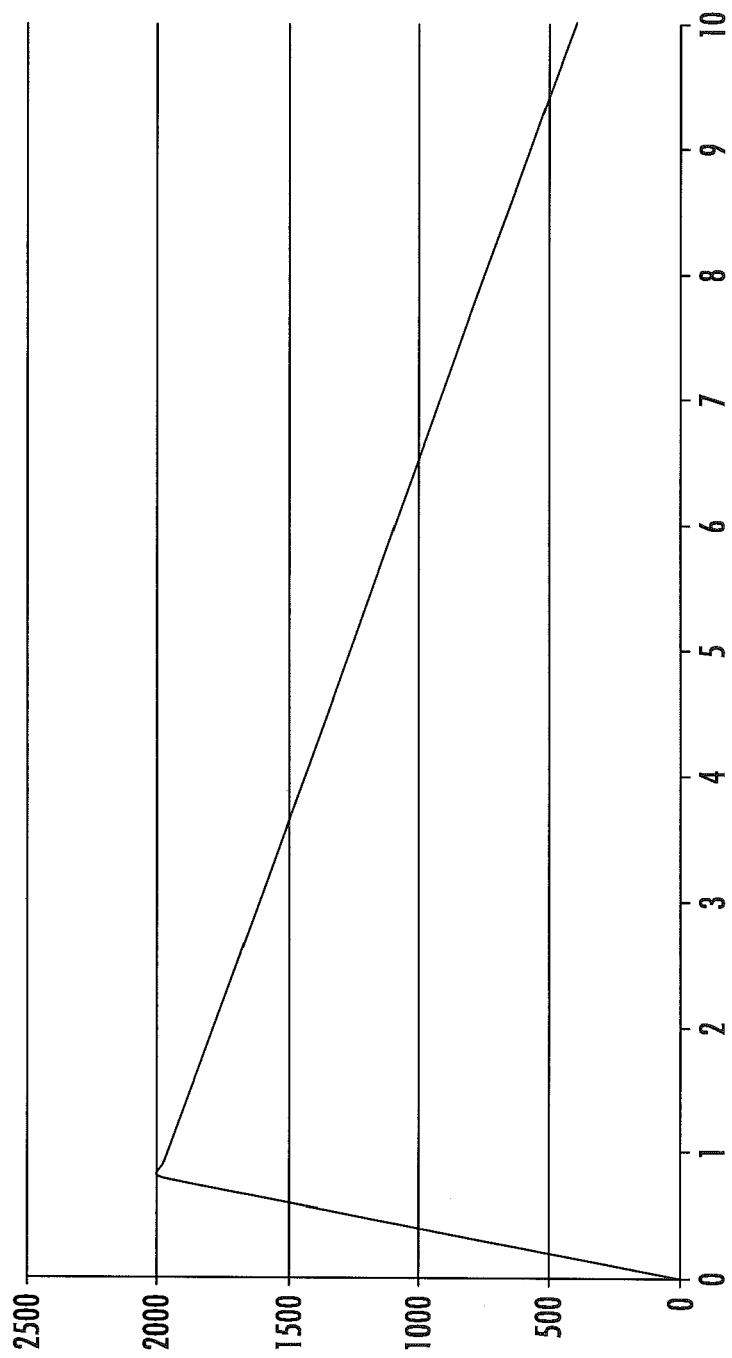
Figure 2:
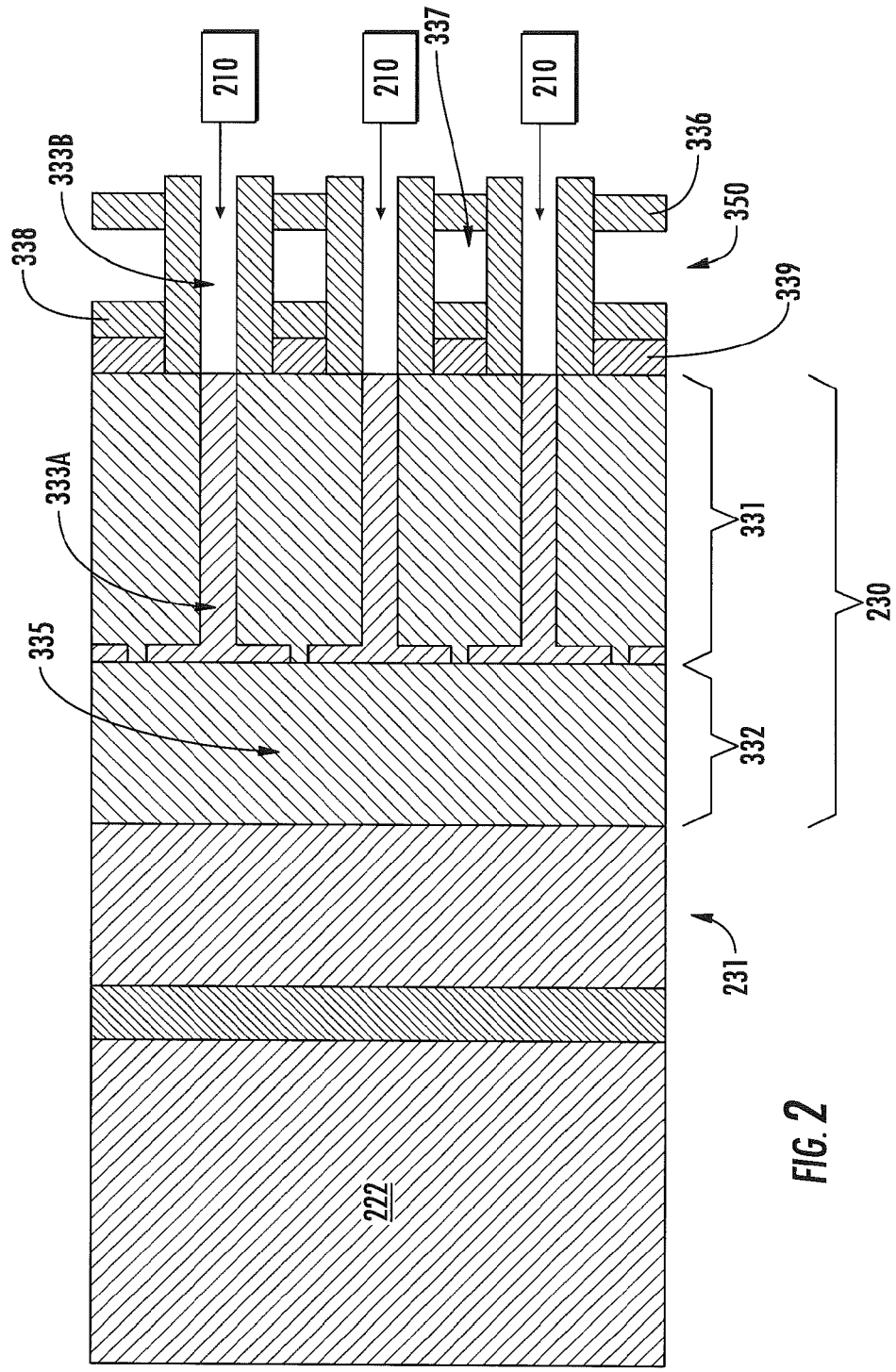
Figure 2E:
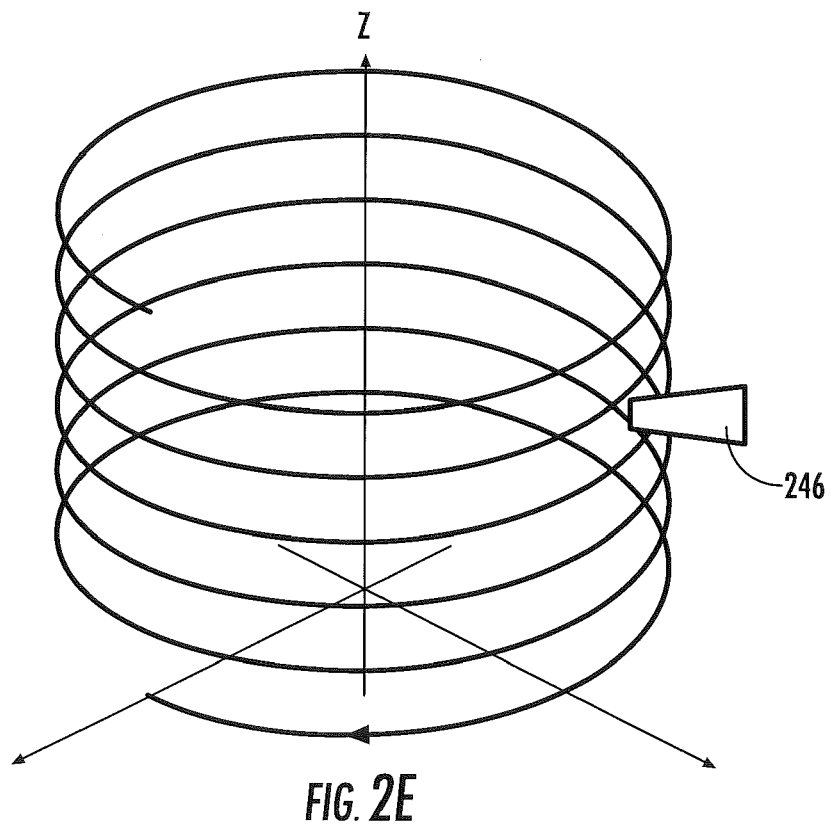
Figure 2F:
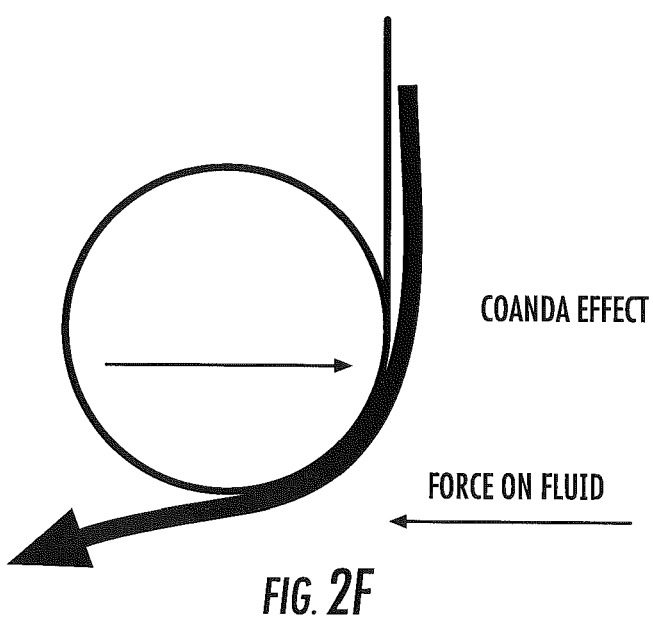
Figure 2G:
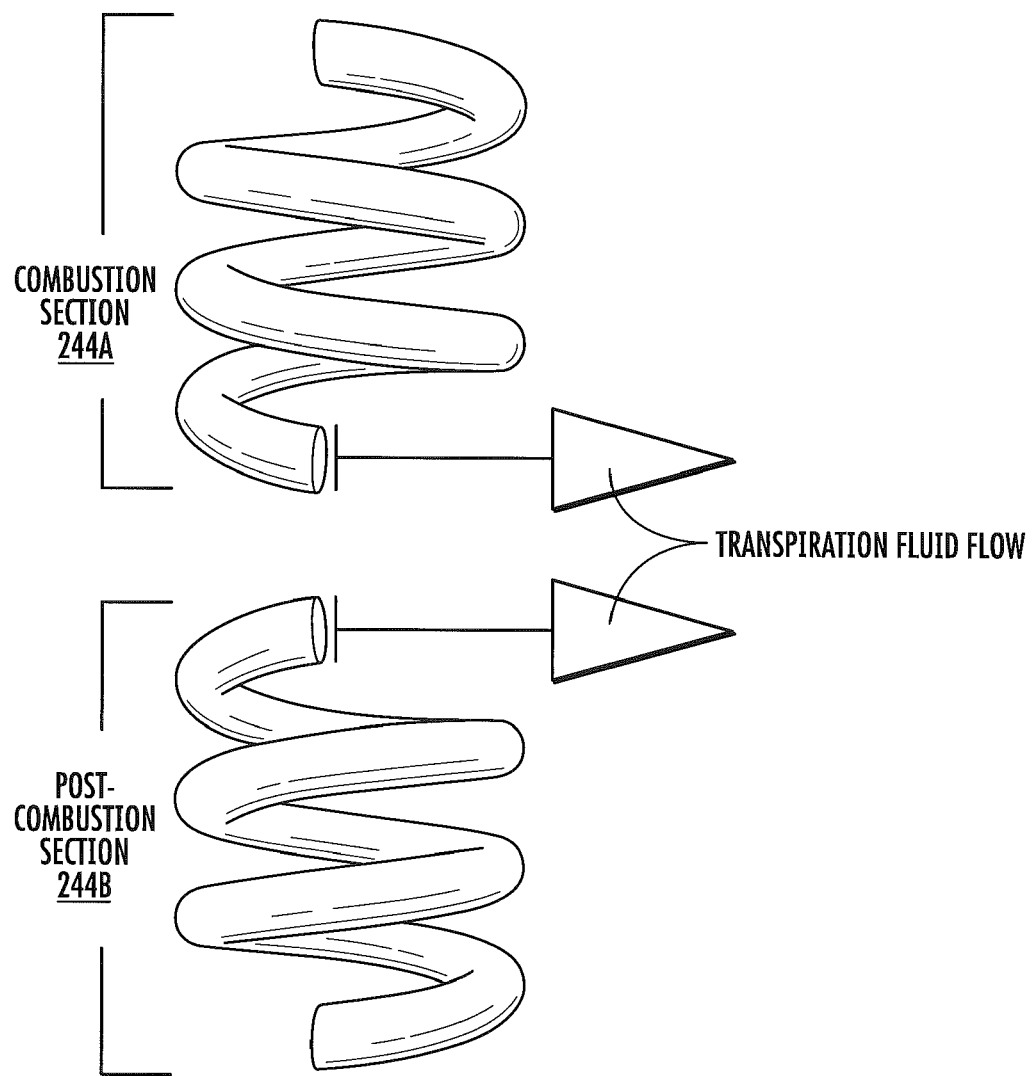
Figures 3A, 3B:
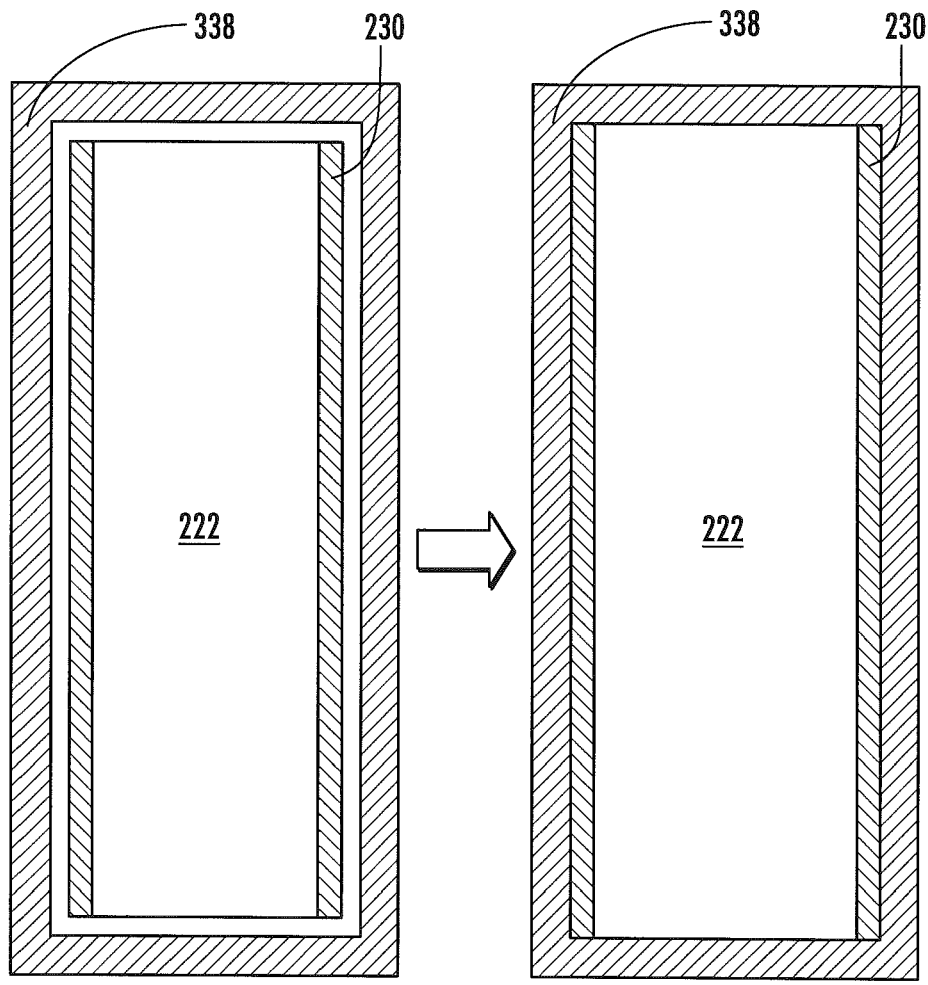
Figure 4:
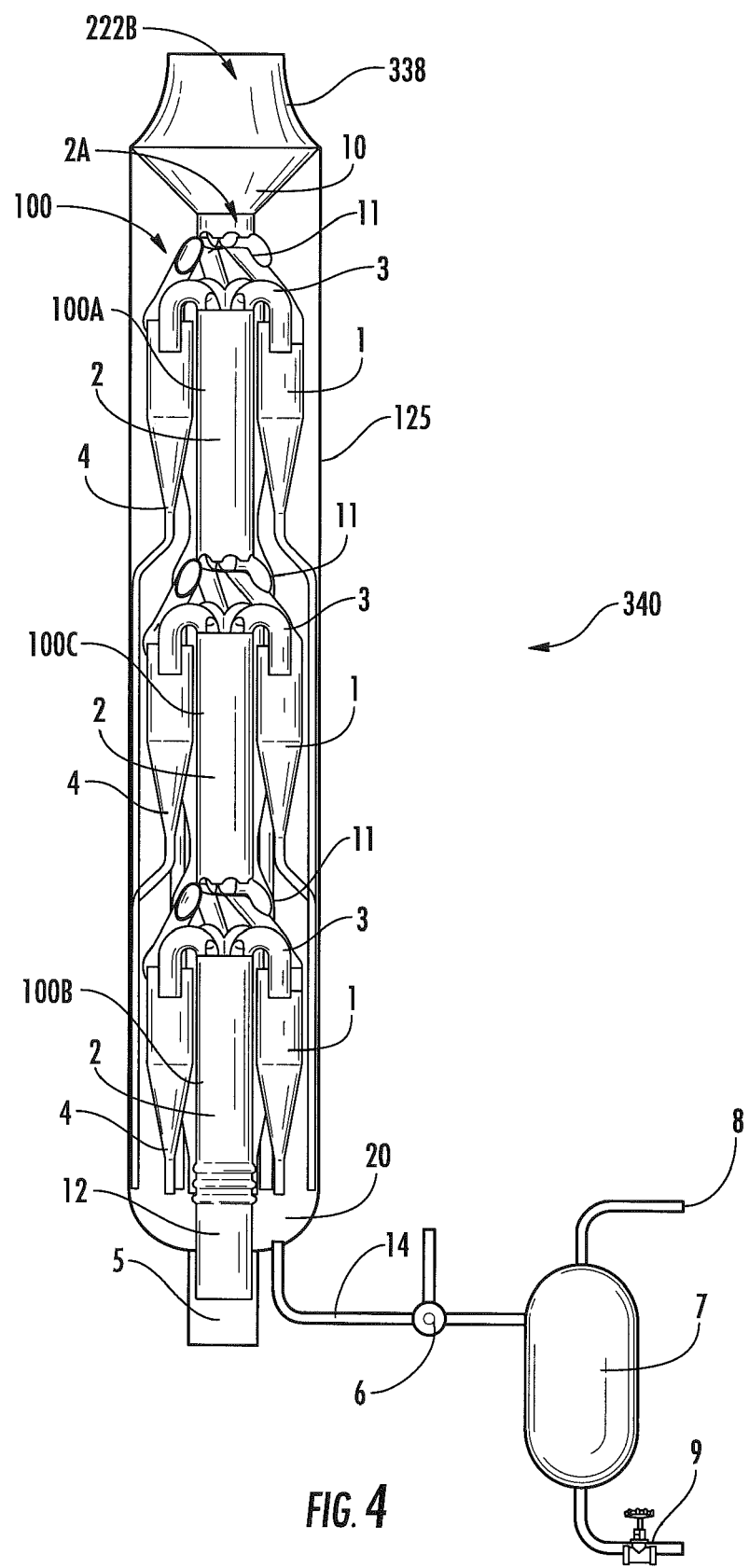
Figure 5:
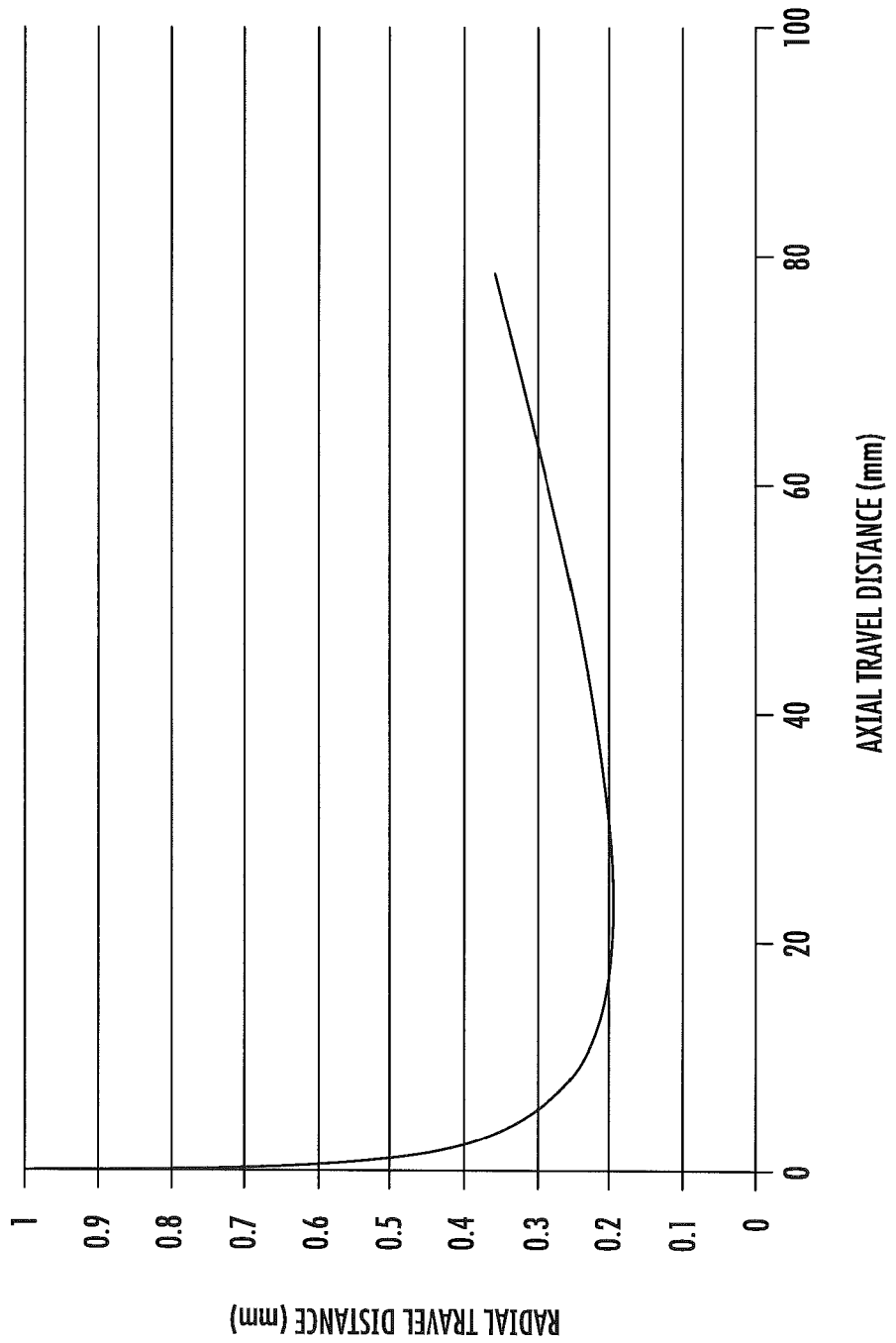
Figure 6:
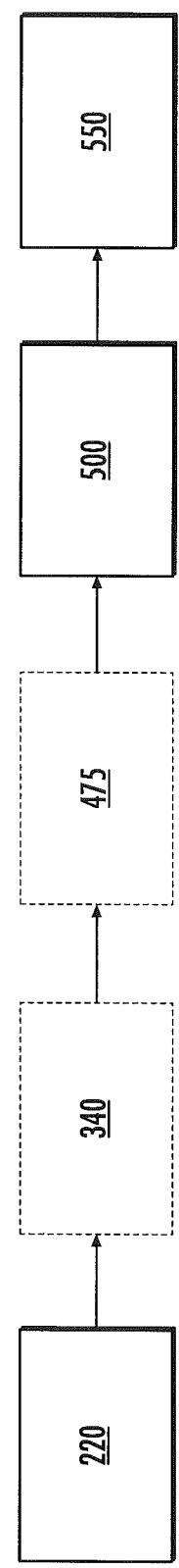

Having thus described the disclosure in general terms, reference will now be made to the accompanying drawings, which are not necessarily drawn to scale, and wherein:

FIG. 1 is a schematic illustration of a transpiration-cooled combustor apparatus, according to certain aspects of the present disclosure;

FIG. 1A is a schematic illustration of a combustor temperature profile along the length of the combustion chamber, according to certain aspects of the present disclosure;

FIG. 2 is a schematic illustration of an exemplary cross-section of a wall of a transpiration member in a combustor apparatus, according to certain aspects of the present disclosure;

FIG. 2A is a schematic illustration of an exemplary cross-section of a wall of a transpiration member in a combustor apparatus, according to certain aspects of the present disclosure, taken perpendicularly to the longitudinal axis thereof and illustrating a pore/perforation configuration for providing a helical flow of a transpiration fluid;

FIG. 2B is a schematic illustration of an exemplary cross-section of a wall of a transpiration member in a combustor apparatus, according to certain aspects of the present disclosure, illustrating an angular pore/perforation configuration for facilitating a helical flow of a transpiration fluid;

FIG. 2C is a schematic illustration of an exemplary cross-section of a wall of a transpiration member in a combustor apparatus, according to certain aspects of the present disclosure, illustrating fused longitudinal strips of the transpiration member for facilitating a helical flow of a transpiration fluid;

FIG. 2D is a schematic illustration of a shield structure configured to be arranged/inserted with respect to the transpiration member shown in FIG. 2C, according to certain aspects of the present disclosure, for facilitating a helical flow of a transpiration fluid;

FIG. 2E is a schematic illustration of a helical flow of a transpiration fluid within a combustion chamber of a combustor apparatus, according to certain aspects of the present disclosure;

FIG. 2F is a schematic illustration of a Coanda effect which may be implemented to facilitate a helical flow of a transpiration fluid within a combustion chamber of a combustor apparatus, according to certain aspects of the present disclosure;

FIG. 2G is a schematic illustration of serially-arranged, opposing helical flows of a transpiration fluid within a combustion chamber of a combustor apparatus, according to certain aspects of the present disclosure;

FIGS. 3A and 3B schematically illustrate a hot fit process for a transpiration member assembly of a combustor apparatus, according to certain aspects of the present disclosure;

FIG. 4 schematically illustrates a combustion product contaminant removal apparatus, according to certain aspects of the present disclosure;

FIG. 5 is a schematic plot showing trajectories of ash particles as a function of average particle size and transpiration substance flow rates, according to certain aspects of the present disclosure; and FIG. 6 is a schematic of an adaptable power generation system, according to certain aspects of the present disclosure.

DETAILED DESCRIPTION OF THE DISCLOSURE

The present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout.

One aspect of a combustor apparatus capable of operating with a solid fuel, according to the present disclosure, is schematically illustrated in FIG. 1, the combustor apparatus being generally indicated by the numeral 220. In this example, the combustor apparatus 220 may be configured to combust a particulate solid such as coal to form a combustion product, though any other suitable combustible organic material, as disclosed herein, may also be used as a fuel. The combustion chamber 222 may be defined by a transpiration member 230, which is configured to direct a transpiration substance, such as a transpiration fluid, therethrough into the combustion chamber 222 (i.e., to facilitate transpiration cooling and/or to buffer interaction between the combustion product and the transpiration member 230). One skilled in the art will appreciate that the transpiration member 230 may be substantially cylindrical, so as to define a substantially cylindrical combustion chamber 222 having an inlet portion 222A and an opposing outlet portion 222B. The transpiration member 230 may be at least partially surrounded by a pressure containment member 338. The inlet portion 222A of the combustion chamber 222 may be configured to receive a fuel mixture from a mixing arrangement, generally indicated by the numeral 250. According to particular aspects, the fuel mixture is combusted within the combustion chamber 222 at a particular combustion temperature to form a combustion product, wherein the combustion chamber 222 is further configured to direct the combustion product toward the outlet portion 222B. A heat removal device 350 (see, e.g., FIG. 2) may be associated with the pressure containment member 338 and configured to control a temperature thereof. In particular instances, the heat removal device 350 may comprise a heat transfer jacket at least partially defined by a wall 336 opposing the pressure containment member 338, wherein a liquid may be circulated in water-circulating jackets 337 defined therebetween. In one aspect, the circulated liquid may be water.

The mixing arrangement 250 is configured to mix a carbonaceous fuel 254 with enriched oxygen 242 and a working fluid 236 to form a fuel mixture 200. The carbonaceous fuel 254 may be provided in the form of a solid carbonaceous fuel, a liquid carbonaceous fuel, and/or a gaseous carbonaceous fuel. The enriched oxygen 242 may be oxygen having a molar purity of greater than about 85%. The enriched oxygen 242 may be supplied, for example, by any air separation system/technique known in the art, such as, for example, a cryogenic air separation process, or a high temperature ion transport membrane oxygen separation process (from air), could be implemented. The working fluid 236 may be carbon dioxide and/or water. In instances where the carbonaceous fuel 254 is a particulate solid, such as powdered coal 254A, the mixing arrangement 250 may be further configured to mix the particulate solid carbonaceous fuel 254A with a fluidizing substance 255. According to one aspect, the particulate solid carbonaceous fuel 254A may have an average particle size of between about 50 microns and about 200 microns. According to yet another aspect, the fluidizing substance 255 may comprise water and/or liquid $CO_2$ having a density of between about 450 kg/m$^3$ and about 1100 kg/m$^3$. More particularly, the fluidizing substance 255 may cooperate with the particulate solid carbonaceous fuel 254A to form a slurry 250A having, for example, between about 25 weight % and about 95 weight % of the particulate solid carbonaceous fuel 254A or, in other instances, between about 25 weight % and about 60 weight % of the particulate solid carbonaceous fuel 254A. Though the oxygen 242 is shown in FIG. 2 as being mixed with the fuel 254 and the working fluid 236 prior to introduction to the combustion chamber 222, one skilled in the art will appreciate that, in some instances, the oxygen 242 may be separately introduced into the combustion chamber 222, as necessary or desired.

The mixing arrangement 250, in some aspects, may comprise, for example, an array of spaced apart injection nozzles (not shown) arranged about an end wall 223 of the transpiration member 230 associated with the inlet portion 222A of the cylindrical combustion chamber 222. Injecting the fuel/fuel mixture into the combustion chamber 222 in this manner may provide, for example, a large surface area of the injected fuel mixture inlet stream which may, in turn, facilitate rapid heat transfer to the injected fuel mixture inlet stream by radiation. The temperature of the injected fuel mixture may thus be rapidly increased to the ignition temperature of the fuel (i.e., the coal particles) and may thus result in a compact combustion. The injection velocity of the fuel mixture may be in the range, for example, of between about 10 msec and about 40 m/sec, though these values may depend on many factors, such as the configuration of the particular injection nozzles. Such an injection arrangement may take many different forms. For example, the injection arrangement may comprise an array of holes, for instance, in the range of between about 0.5 mm and about 3 mm diameter, wherein the fuel injected would be injected therethrough at a velocity of between about 10 m/s and about 40 m/s.

Such a "direct injection" of the fuel/fuel mixture through generally straight, linear, and/or unobstructed passages directly into the combustion chamber 222 may, for example, reduce wear, corrosion, and/or particulate accumulation, particularly in instances where the fuel includes a solids component (i.e., coal slurry in a partial oxidation (PDX) combustor). In some instances, though, it may be advantageous for the fuel/fuel mixture to deviate from the straight uniform flow once inside the combustion chamber 222. For example, it may be advantageous, in some aspects, to cause the fuel/fuel mixture to be swirled or otherwise disrupted from the straight uniform flow so as to, for instance, promote mixing of the fuel/fuel mixture, thus resulting in a more efficient combustion process.

In other aspects, the mixing arrangement 250 may be remote with respect to or otherwise separate from the combustion chamber 222. For example, in some aspects, the mixing arrangement 250 may be configured to direct the fuel mixture 200 to a burner device 300 extending into the combustion chamber 222 through the pressure containment member 338 and the transpiration member 230. The burner device 300 may be configured to introduce the fuel/fuel mixture into the combustion chamber 222 in a straight, substantially uniform flow, similar to the "direct injection" arrangement. That is, the burner device 300 may be configured to receive the fuel/fuel mixture from the mixing arrangement 250 and to direct a substantially uniform linear flow of the fuel/fuel mixture into the inlet portion 222A of the combustion chamber 222. However, in some instances (i.e., using a fuel that does not include solid particulates), the burner device 300 may include appropriate provisions for causing or otherwise inducing the fuel/fuel mixture to swirl or be swirled upon being directed into the combustion chamber 222, as will be appreciated by one skilled in the art. That is, the burner device 300 may be configured to swirl or otherwise disrupted from the straight uniform flow of the fuel/fuel mixture upon introduction thereof into the combustion chamber 222. In some aspects, the burner device 300 may be configured to receive the fuel/fuel mixture from the mixing arrangement 250 and to direct the fuel/fuel mixture into the inlet portion 222A of the combustion chamber 222, while inducing swirl of the fuel/fuel mixture directed into the combustion chamber 222. More particularly, the burner device 300 may be configured to induce swirl of the fuel/fuel mixture upon exit of the fuel/fuel mixture therefrom into the combustion chamber 222.

As more particularly shown in FIG. 2, the combustion chamber 222 is defined by the transpiration member 230, which may be at least partially surrounded by a pressure containment member 338. In some instances, the pressure containment member 338 may further be at least partially surrounded by a heat transfer jacket 336, wherein the heat transfer jacket 336 cooperates with the pressure containment member 338 to define one or more channels 337 therebetween, through which a low pressure water stream may be circulated. Through an evaporation mechanism, the circulated water may thus be used to control and/or maintain a selected temperature of the pressure containment member 338, for example, in a range of between about 100° C. and about 250° C. In some aspects, an insulation layer 339 may be disposed between the transpiration member 230 and the pressure containment member 338.

In some instances, the transpiration member 230 may comprise, for example, an outer transpiration member 331 and an inner transpiration member 332, the inner transpiration member 332 being disposed opposite the outer transpiration member 331 from the pressure containment member 338, and defining the combustion chamber 222. The outer transpiration member 331 may be comprised of any suitable high temperature-resistant material such as, for example, steel and steel alloys, including stainless steel and nickel alloys. In some instances, the outer transpiration member 331 may be configured to define first transpiration fluid supply passages 333A extending therethrough from the surface thereof adjacent to the insulation layer 339 to the surface thereof adjacent to the inner transpiration member 332. The first transpiration fluid supply passages 333A may, in some instances, correspond to second transpiration fluid supply passages 333B defined by the pressure containment member 338, the heat transfer jacket 336 and/or the insulation layer 339. The first and second transpiration fluid supply passages 333A, 333B may thus be configured to cooperate to direct a transpiration substance, such as a transpiration fluid 210, therethrough to the inner transpiration member 332. In some instances, as shown, for example, in FIG. 1, the transpiration fluid 210 may comprise the working fluid 236, and may be obtained from the same source associated therewith. The first and second transpiration fluid supply passages 333A, 333B may be insulated, as necessary, for delivering the transpiration fluid 210 (i.e., $CO_2$) in sufficient supply and at a sufficient pressure such that the transpiration fluid 210 is directed through the inner transpiration member 332 and into the combustion chamber 222. Such measures involving the transpiration member 230 and associated transpiration fluid 210, as disclosed herein, may allow the combustor apparatus 220 to operate at the relatively high pressures and relatively high temperatures otherwise disclosed herein.

In this regard, the inner transpiration member 332 may be comprised of, for example, a porous ceramic material, a perforated material, a laminate material, a porous mat comprised of fibers randomly orientated in two dimensions and ordered in the third dimension, or any other suitable material or combinations thereof exhibiting the characteristics required thereof as disclosed herein, namely multiple flow passages or pores or other suitable openings 335 for receiving and directing the transpiration fluid through the inner transpiration member 332. Non-limiting examples of porous ceramic and other materials suitable for such transpiration-cooling systems include aluminum oxide, zirconium oxide, transformation-toughened zirconium, copper, molybdenum, tungsten, copper-infiltrated tungsten, tungsten-coated molybdenum, tungsten-coated copper, various high temperature nickel alloys, and rhenium-sheathed or coated materials. Sources of suitable materials include, for example CoorsTek, Inc., (Golden, Colo.) (zirconium); UltraMet Advanced Materials Solutions (Pacoima, Calif.) (refractory metal coatings); Osram Sylvania (Danvers, Mass.) (tungsten/copper); and MarkeTech International, Inc. (Port Townsend, Wash.) (tungsten). Examples of perforated materials suitable for such transpiration-cooling systems include all of the above materials and suppliers (where the perforated end structures may be obtained, for example, by perforating an initially nonporous structure using methods known in the manufacturing art). Examples of suitable laminate materials include all of the above materials and suppliers (where the laminate end structures may be obtained, for example, by laminating nonporous or partially porous structures in such a manner as to achieve the desired end porosity using methods known in the manufacturing art).

In still further aspects, the inner transpiration member 332 may extend from the inlet portion 222A to the outlet portion 222B of the transpiration member 230. In some instances, the perforated/porous structure of the inner transpiration member 332 may extend substantially completely (axially) from the inlet portion 222A to the outlet portion 222B such that the transpiration fluid 210 is directed into substantially the entire length of the combustion chamber 222. That is, substantially the entirety of the inner transpiration member 332 may be configured with a perforated/porous structure such that substantially the entire length of the combustion chamber 222 is transpiration-cooled. More particularly, in some aspects, the cumulative perforation/pore area may be substantially equal to the surface area of the inner transpiration member 332. That is, the ratio of pore area to total wall area (% porosity) may be on the order of, for example 50%. In still other aspects, the perforations/pores may be spaced apart at an appropriate density such that substantially uniform distribution of the transpiration substance from the inner transpiration member 332 into the combustion chamber 222 is achieved (i.e., no "dead spots" where the flow or presence of the transpiration substance 210 is lacking). In one example, the inner transpiration member 332 may include an array of perforations/pores on the order of 250×250 per square inch, so as to provide about 62,500 pores/in$^2$, with such perforations/pores being spaced about 0.004 inches (about 0.1 mm) apart. One skilled in the art will appreciate, however, that the configuration of the pore array may be varied, as appropriate, so as to be adaptable to other system configuration parameters or to achieve a desired result such as, for instance, a desired pressure drop versus flow rate across the transpiration member 230. In a further example, the pore array may vary in size from about 10×10 per square inch to about 10,000×10,000 per square inch, with porosity percentages varying from between about 10% to about 80%.

FIGS. 3A and 3B illustrate that, in one aspect of a combustor apparatus 220, the structure defining the combustion chamber 222 may be formed through a "hot" interference fit between the transpiration member 230 and the surrounding structure, such as the pressure containment inlet member 338 or the insulation layer 339 disposed between the transpiration member 230 and the pressure containment member 338. For example, when relatively "cold," the transpiration member 230 may be dimensioned to be smaller, radially and/or axially, with respect to the surrounding pressure containment member 338. As such, when inserted into the pressure containment member 338, a radial and/or axial gap may be present therebetween (see, e.g., FIG. 3A). Of course, such dimensional differences may facilitate insertion of the transpiration member 230 into the pressure containment member 338. However, when heated, for example, toward the operational temperature, the transpiration member 230 may be configured to expand radially and/or axially to reduce or eliminate the noted gaps (see, e.g., FIG. 3B). In doing so, an interference axial and/or radial fit may be formed between the transpiration member 230 and the pressure containment member 338. In instances involving a transpiration member 230 with an outer transpiration member 331 and an inner transpiration member 332, such an interference fit may place the inner transpiration member 332 under compression. As such, suitable high temperature resistant brittle materials, such as a porous ceramic, may be used to form the inner transpiration member 332.

With the inner transpiration member 332 thus configured, the transpiration substance 210 may comprise, for example, carbon dioxide (i.e., from the same source as the working fluid 236) directed through the inner transpiration member 332 such that the transpiration substance 210 forms a buffer layer 231 (i.e., a "vapor wall") immediately adjacent to the inner transpiration member 332 within the combustion chamber 222, wherein the buffer layer 231 may be configured to buffer interaction between the inner transpiration member 332 and the liquefied incombustible elements and heat associated with the combustion product. That is, in some instances, the transpiration fluid 210 can be delivered through the inner transpiration member 332, for example, at least at the pressure within the combustion chamber 222, wherein the flow rate of the transpiration fluid 210 (i.e., $CO_2$ stream) into the combustion chamber 222 is sufficient for the transpiration fluid 210 to mix with and cool the combustion products to form an exit fluid mixture at a sufficient temperature with respect to the inlet requirement of the subsequent downstream process (i.e., a turbine may require an inlet temperature, for instance, of about 1225° C.), but wherein the exit fluid mixture temperature remains sufficiently high to maintain slag droplets or other contaminants in the fuel in a fluid or liquid state. The liquid state of the incombustible elements of the fuel may facilitate, for example, separation of such contaminants from the combustion product in liquid form, preferably in a free flowing, low viscosity form, which will be less likely to clog or otherwise damage any removal system implemented for such separation. In practice, such requirements may depend on various factors such as the type of solid carbonaceous fuel (i.e., coal) employed and the particular characteristics of the slag formed in the combustion process. That is, the combustion temperature within the combustion chamber 222 is preferably such that any incombustible elements in the carbonaceous fuel are liquefied within the combustion product.

In particular aspects, the porous inner transpiration member 332 is thus configured to direct the transpiration fluid/substance into the combustion chamber 222 in a radially inward manner so as to form a fluid barrier wall or buffer layer 231 about the surface of the inner transpiration member 332 defining the combustion chamber 222 (see, e.g., FIG. 2). In one particular aspect, the porous inner transpiration member 332 is thus configured to direct the transpiration fluid into the combustion chamber 222, such that the transpiration substance 210 enters the combustion chamber 222 at a substantially right angle (90°) with respect to the inner surface of the inner transpiration member 332. Among other advantages, the introduction of the transpiration substance 210 at the substantially right angle with respect to the inner transpiration member 332 may facilitate or otherwise enhance the effect of directing slag liquid or solid droplets or other contaminants or hot combustion fluid vortices away from the inner surface of the inner transpiration member 332. Reducing, minimizing, or otherwise preventing contact between the slag liquid or solid droplets and the inner transpiration member 332 may, for instance, prevent the coalescence of such contaminants into larger droplets or masses, which may be known to occur upon contact between droplets/particles and solid walls, and which may cause damage to the inner transpiration member 332. The introduction of the transpiration substance 210 at a substantially right angle with respect to the inner transpiration member 332 may thus facilitate or otherwise enhance the prevention of the formation of combustion fluid vortices in proximity to the inner transpiration member 332 with sufficient velocity or momentum to impinge upon and potentially damage the inner transpiration member 332.

As previously disclosed, it may be advantageous, in other instances, to induce swirl, or other disruption of the straight uniform flow, into the fuel/fuel mixture upon the fuel/fuel mixture being directed into the combustion chamber 222. By accomplishing such flow disruption after the fuel/fuel mixture has been delivered into the combustion chamber 222, drawbacks associated with nozzles or other burner devices or delivery devices used to cause such flow disruption prior to delivery of the fuel/fuel mixture into the combustion chamber 222 may be avoided or minimized. However, one skilled in the art will appreciate that, in some instances, such post-introduction of the fuel/fuel mixture may sometimes be necessary and/or desired in conjunction with such fuel/fuel mixture delivery devices imparting disruption of the pre-introduction flow thereof.

As such, in some aspects of the present disclosure, at least the inner transpiration member 332 may be configured to substantially uniformly direct the transpiration fluid 210 therethrough toward the combustion chamber 222, such that the transpiration fluid 210 is directed to flow helically (see, e.g., FIG. 2E) about the perimeter 221 (see, e.g., FIG. 2A) thereof and longitudinally between the inlet portion 222A and the outlet portion 222B, to form the fluid barrier wall or buffer layer 231 about the surface of the inner transpiration member 332 to buffer interaction between the transpiration member 332 and the combustion products and/or the fuel mixture. More particularly, in some aspects, at least the inner transpiration member 332 is configured to direct the transpiration fluid 210 therethrough and into the combustion chamber 222, substantially uniformly about the perimeter 221 thereof and longitudinally between the inlet portion 222A and the outlet portion 222B, such that the transpiration fluid 210 is directed to flow substantially tangential to the perimeter 221 of the inner transpiration member 332 and helically (i.e., in a spiral or coil form) thereabout, as shown, for example, in FIGS. 2A and 2E. For example, the perforations/pores 335 defined by the inner transpiration member 332 may be arcuate or angled upon extending between the outer surface and the inner surface thereof (see, e.g., FIG. 2A) so as to direct the transpiration fluid 210 flowing therethrough substantially tangential to or otherwise along the perimeter 221 of the combustion chamber 222.

In another example, pores along longitudinal strips of the inner transpiration member 332 may be fused/closed so as to facilitate the transpiration fluid 210 flowing therethrough substantially tangential to or otherwise along the perimeter 221 of the combustion chamber 222 (see, e.g., FIG. 2C). In other instances, in addition to or instead of fusing longitudinal strips of the inner transpiration member 332, a shield structure 224 (i.e., a metal or ceramic shield arrangement) could be arranged/inserted with respect to the inner transpiration member 332 as shown, for example, in FIG. 2C, so as to block particular porous wall surfaces to prevent radial flow therethrough, without blocking other surfaces facilitating flow of the transpiration fluid 210 substantially tangential to or otherwise along the perimeter 221 of the combustion chamber 222 (see, e.g., FIGS. 2C and 2D). Though the structure 224 or the fusing process may be configured to direct the transpiration fluid 210 substantially tangential to or otherwise along the perimeter 221 of the combustion chamber 222, once the flow thereof interacts with the longitudinal combustion flow, the vector sum flow will become substantially helical. One skilled in the art, however, will appreciate that there may be many other ways in which to configure the inner transpiration member 332 to accomplish the flow of the transpiration fluid 210 substantially tangential to or otherwise along the perimeter 221 of the combustion chamber 222.

In yet another example, the perforations/pores 335 may be configured to impart a Coanda effect on the transpiration fluid 210 (see, e.g., FIG. 2F) directed therethrough so as to direct the transpiration fluid 210 flowing therethrough substantially tangential to or otherwise along the perimeter 221 of the combustion chamber 222. In such instances, the flow of the fuel/fuel mixture and/or the combustion products from the inlet portion 222A toward the outlet portion 222B may cause the flow of the transpiration fluid 210 to likewise be directed longitudinally toward the outlet portion 222B to thereby effectuate the helical or spiral flow of the transpiration fluid 210 along the combustion chamber 222. In such instances, the pores/perforations 335 defined by the inner transpiration member 332 may extend therethrough substantially perpendicular to the longitudinal axis of the combustion chamber 222 as shown, for example, in FIG. 2. However, in other instances, the pores/perforations 335 may be angled toward the outlet portion 222B (see, e.g., FIG. 2B) to promote the helical/spiral flow of the transpiration fluid 210 and/or mixing with the fuel mixture/combustion products, or the pores/perforations 335 may be angled toward the inlet portion 222A (not shown) to otherwise affect the interaction between the transpiration fluid 210 and the fuel mixture and/or the combustion products (i.e., promote mixing or control combustion rate). Accordingly, such manipulation of the flow of the fuel mixture/combustion products along the combustion chamber 222 may provide desired effects in and control of the combustion characteristics and/or kinetics during the combustion process, in some instances, without a physical device otherwise affecting the substantially straight and uniform flow of the fuel/fuel mixture into the combustion chamber 222. Such an arrangement, namely the absence of physical devices for affecting the flow of the fuel mixture/combustion products, may otherwise be advantageous, for example, in eliminating accumulation locales for particulates contained in the fuel mixture and/or the combustion products, as will be appreciated by one skilled in the art.

In so manipulating the flow of the fuel mixture/combustion products, so as to impart or otherwise induce swirling thereof within the combustion chamber 222, the burner device 300 and/or the transpiration member 230 may be configured in different arrangements. For example, in one aspect, the burner device 300 may be configured to receive the fuel/fuel mixture from the mixing arrangement 250 and to direct the fuel/fuel mixture into the inlet portion 222A of the combustion chamber 222 in a flow direction generally opposite to the helical flow of the transpiration fluid 210. In another aspect, the burner device 300 may be configured to receive the fuel/fuel mixture from the mixing arrangement 250 and to direct the fuel/fuel mixture into the inlet portion 222A of the combustion chamber 222 in a direction consistent with (i.e., in the same direction as) the helical flow of the transpiration fluid 210. In yet another aspect, the burner device 300 may be configured to receive the fuel/fuel mixture from the mixing arrangement 250 and to direct a substantially uniform linear flow of the fuel/fuel mixture into the inlet portion 222A of the combustion chamber 222, wherein the helical flow of the transpiration fluid 210 is configured to induce swirl of the fuel/fuel mixture and/or the combustion products within the combustion chamber 222.

Each such arrangement may have a separate purpose and/or effect. For example, directing the flow of the fuel/fuel mixture in a direction opposite to the helical flow of the transpiration fluid 210 may slow or stop the induced swirl in the fuel/fuel mixture due to friction between the opposing flows. As such, combustion of the fuel/fuel mixture may also be slowed. Conversely, if the fuel/fuel mixture is directed in the same direction as the helical flow of the transpiration fluid 210, swirling of the fuel/fuel mixture and/or the combustion products may be enhanced, possibly decreasing the time needed for substantially complete combustion of the fuel/fuel mixture or otherwise increasing the proportion of the fuel/fuel mixture combusted during the process (i.e., increase the burnout ratio of the fuel). Directing the fuel/fuel mixture in a substantially uniform linear flow may be advantageous, for instance, when the fuel/fuel mixture includes solids or other particulates, as previously disclosed, since the flow is unimpeded by mechanical devices, and wherein the desired swirling thereof can then be induced by the helical flow of the transpiration fluid 210 to enhance combustion thereof.

Accordingly, such effects can, in some aspects, be combined in order to enhance the efficacy of the combustor apparatus 220. For example, as shown in FIG. 2E, the combustion chamber 222 may include a combustion section 244A disposed toward the inlet portion 222A and a post-combustion section 244B disposed toward the outlet portion 222B, wherein the transpiration member 230 may be configured such that the helical flow of the transpiration fluid 210 over the post-combustion section 244B is opposite to the helical flow of the transpiration 210 over the combustion section 244A so as to reverse the induced swirl of the combustion product in the post-combustion section 244B with respect to the induced swirl of the fuel/fuel mixture in the combustion section 244A. In such instances, the fuel/fuel mixture may be directed into combustion section 244A of the combustion chamber 222 in the same direction as the helical flow of the transpiration fluid 210, so as to enhance combustion thereof, as previously discussed. Reversing the direction of the helical flow of the transpiration fluid 210 in the post-combustion section 244B may, for instance, effectuate a "counter-swirl" in the combustion products by increasing local shear, and thereby enhancing mixing of the combustion products. In doing so, the combustion products may be more quickly and completely mixed into the exit flow stream from the outlet portion 222B so as to provide a more homogenous exit flow stream from the combustor apparatus 220.

In further aspects, the transpiration member 230 may be configured such that the helical flow of the transpiration fluid 210 is alternatingly reversed along at least a section thereof so as to alternatingly reverse the induced swirl of the fuel/fuel mixture and/or the combustion products between the inlet portion 222A and the outlet portion 222B. Such alternating section of opposing helical flow of the transpiration fluid 210 may, for instance, increase local turbulence and thus increase mixing of the fuel/fuel mixture and/or the combustion products. In some instances, for example, to further increase such local turbulence to induce other changes in the combustion dynamics, kinetics, and/or the flow path within or through the combustion chamber 222, the transpiration member 230 may further include at least one transpiration port 246 (see, e.g., FIG. 2G) extending therethrough, wherein the at least one transpiration port 246 may be configured to direct a supplemental linear flow of the transpiration fluid 210 into the fuel/fuel mixture and/or the combustion products so as to possibly affect flow characteristics thereof, as well as combustion dynamics and kinetics. In some aspects, an appropriately configured jet of the transpiration fluid directed through the at least one laterally-extending transpiration port 246 may be sufficient to bifurcate the flow within the combustion chamber 222 or otherwise cause the flow to "bend" around the jet of the transpiration fluid, thereby allowing the flow to be shaped along the length of the combustion chamber 222. Where more than one of such transpiration ports 246 are used, the transpiration ports 246 may be spaced apart, angularly and/or longitudinally with respect to the combustion chamber 222, so as to, for instance, move higher temperature combustion regions to other sectors within the combustion chamber 222 (i.e., prevent localized heating or overheating of certain sectors of the combustion chamber 222), or induce mixing between different combustion regions having different temperatures.

In some instances, the outer transpiration member 331, the pressure containment member 338, the heat transfer jacket 336 and/or the insulation layer 339 may be configured, either individually or in combination, to provide a "manifold" effect (i.e., to provide a substantially uniformly distributed supply) with regard to the delivery of the transpiration substance/fluid 210 to and through the inner transpiration member 332 and into the combustion chamber 222. That is, a substantially uniform supply (in terms of flow rate, pressure, or any other suitable and appropriate measure) of the transpiration substance 210 into the combustion chamber 222 may be achieved by configuring the outer transpiration member 331, the pressure containment member 338, the heat transfer jacket 336 and/or the insulation layer 339 to provide a uniform supply of the transpiration substance 210 to the inner transpiration member 332, or the supply of the transpiration substance 210 about the outer surface of the inner transpiration member 332 may be particularly customized and configured such that a substantially uniform distribution of the transpiration substance 210 within, about or along the combustion chamber 222 is achieved. Such substantially uniform distribution and supply of the transpiration substance 210 into the combustion chamber 222 may minimize or prevent the formation of hot combustion fluid vortices, since such hot combustion fluid vortices may otherwise be formed through interaction between nonuniform transpiration fluid flow and the combustion fluid flow, and such vortices may, in turn, impinge upon and potentially damage the inner transpiration member 332. In some aspects, the uniformity of the distribution of the transpiration substance 210 within the combustion chamber 222 is desirable in at least a local manner or frame of reference. That is, over relatively large distances along the combustion chamber 222, the uniformity of the flow of the transpiration substance/fluid 210 may vary, but it may be desirable and/or necessary for the flow to vary smoothly to prevent discontinuities in the flow profile that may be conducive to forming the potentially-damaging vortices.

The surface of the inner transpiration member 332 is also heated by combustion products. As such, the porous inner transpiration member 332 may be configured to have a suitable thermal conductivity such that the transpiration fluid 210 passing through the inner transpiration member 332 is heated, while the porous inner transpiration member 332 is simultaneously cooled, resulting in the temperature of the surface of the inner transpiration member 332 defining the combustion chamber 222 being, for example, between about 200° C. and about 700° C. (and, in some instances, up to about 1000° C.) in the region of the highest combustion temperature. The fluid barrier wall or buffer layer 231 formed by the transpiration fluid 210 in cooperation with the inner transpiration member 332 thus buffers interaction between the inner transpiration member 332 and the high temperature combustion products and the slag or other contaminant particles and, as such, buffers the inner transpiration member 332 from contact, fouling, or other damage. Further, the transpiration fluid 210 introduced into the combustion chamber 222 via the inner transpiration member 332 in such a manner so as to regulate an exit mixture of the transpiration fluid 210 and the combustion products about the outlet portion 222B of the combustion chamber 222 at a temperature of between about 400° C. and about 3500° C.

One skilled in the art will appreciate that reference to an exit mixture of the transpiration fluid 210 and the combustion products about the outlet portion 222B of the combustion chamber 222 at a temperature of between about 400° C. and about 3500° C., does not necessarily indicate that the temperature of the exit mixture peaks at the exit of the outlet portion 222B of the combustion chamber 222. In practice, the combustor temperature will always reach a much higher temperature somewhere along the length thereof, between the inlet portion 222A and the outlet portion 222B of the combustion chamber 222, as schematically illustrated, for example, in FIG. 1A (with a relative temperature plotted along the y-axis, and a relative position along the combustion chamber, between the inlet portion and outlet portion, plotted along the x-axis). In general, it may be desirable to attain a sufficiently high temperature in order to complete the combustion process in the combustion chamber 222 rapidly enough so that the reaction is complete before the exit mixture exits the combustion chamber 222. After the peak temperature is attained within the combustion chamber 222, the temperature of the exit mixture may, in some instances, fall due to dilution from the transpiration substance/fluid 210.

According to certain aspects, a transpiration fluid 210 suitable for implementation in a combustor apparatus 220 as disclosed herein may include any appropriate fluid capable of being provided at a flow of sufficient quantity and pressure through the inner transpiration member 332 to form the fluid barrier wall/buffer layer 231 and capable of diluting the combustion products to produce a suitable final outlet temperature of the working fluid/combustion products exit stream. In some aspects, $CO_2$ may be a suitable transpiration fluid 210 in that the fluid barrier wall/buffer layer formed thereby may demonstrate good thermal insulating properties as well as desirable visible light and UV light absorption properties. If implemented, $CO_2$ is used as a supercritical fluid. Other examples of a suitable transpiration fluid include, for example, $H_2O$ or cooled combustion product gases recycled from downstream processes. Some fuels may be used as transpiration fluids during startup of the combustor apparatus to achieve, for example, appropriate operating temperatures and pressures in the combustion chamber 222 prior to injection of the fuel source used during operation. Some fuels may also be used as the transpiration fluid to adjust or maintain the operating temperatures and pressures of the combustor apparatus 220 during switchover between fuel sources, such as when switching from coal to biomass as the fuel source. In some aspects, two or more transpiration fluids can be used. The transpiration fluid 210 can be optimized for the temperature and pressure conditions of the combustion chamber 222 where the transpiration fluid 210 forms the fluid barrier wall/buffer layer 231.

Aspects of the present disclosure thus provide apparatuses and methods for producing power, such as electrical power, through use of a high efficiency fuel combustor apparatus 220 and an associated working fluid 236. The working fluid 236 is introduced to the combustor apparatus 220 in conjunction with an appropriate fuel 254 and oxidant 242, and any associated materials that may also be useful for efficient combustion. In particular aspects, implementing a combustor apparatus 220 configured to operate at relatively high temperatures (e.g., in the range of between about 1,300° C. and about 5,000° C.), the working fluid 236 can facilitate moderation of the temperature of a fluid stream exiting the combustor apparatus 220 so that the fluid stream can be utilized by extracting energy therefrom for power production purposes.

In certain aspects, a transpiration-cooled combustor apparatus 220 can be implemented in a power generation system, using a circulated working fluid 236 comprising, for example, predominantly $CO_2$ and/or $H_2O$. In one particular aspect, the working fluid 236 entering the combustor apparatus 220 preferably comprises substantially only $CO_2$. In the combustor apparatus 220, operating under oxidizing conditions, the $CO_2$ working fluid 236 can comingle with one or more components of the fuel 254, an oxidant 242, and any products of the fuel combustion process. Thus, the working fluid 236 directed toward the outlet portion 222B of and exiting the combustor apparatus 220, which may also be referred to herein as an exit fluid stream, may comprise, as shown in FIG. 1, predominantly $CO_2$ (in instances where the working fluid is predominantly $CO_2$) along with smaller amounts of other materials, such as $H_2O$, $O_2$, $N_2$, argon, $SO_2$, $SO_3$, NO, $NO_2$, HCl, Hg and traces of other components which may be products of the combustion process (e.g., particulates or contaminants, such as ash or liquefied ash). See element 150 in FIG. 1. Operation of the combustor apparatus 220 under reducing conditions may result in an exit fluid stream with a different list of possible components, including $CO_2$, $H_2O$, $H_2$, CO, $NH_3$, $H_2S$, COS, HCl, $N_2$, and argon, as shown in element 175 in FIG. 1. As discussed in further detail herein, the combustion process associated with the combustor apparatus 220 may be controlled such that the nature of the exit fluid stream can be either reducing or oxidizing, wherein either instance can provide particular benefits.

In particular aspects, the combustor apparatus 220 may be configured as a high efficiency, transpiration-cooled combustor apparatus capable of providing relatively complete combustion of a fuel 254 at a relatively high operating temperature, for example, in the range of between about 1300° C. and about 5000° C. Such a combustor apparatus 220 may, in some instances, implement one or more cooling fluids, and/or one or more transpiration fluids 210. In association with the combustor apparatus 220, additional components may also be implemented. For example, an air separation unit may be provided for separating $N_2$ and $O_2$, and a fuel injector device may be provided for receiving $O_2$ from the air separation unit and combining the $O_2$ with $CO_2$ and/or $H_2O$, and a fuel stream comprising a gas, a liquid, a supercritical fluid, or a solid particulate fuel slurried in a high density $CO_2$ fluid.

In another aspect, the transpiration-cooled combustor apparatus 220 may include a fuel injector for injecting a pressurized fuel stream into the combustion chamber 222 of the combustor apparatus 220, wherein the fuel stream may comprise a processed carbonaceous fuel 254, a fluidizing medium 255 (which may comprise the working fluid 236, as discussed herein), and oxygen 242. The oxygen (enriched) 242 and the $CO_2$ working fluid 236 can be combined as a homogeneous supercritical mixture. The quantity of oxygen present may be sufficient to combust the fuel and produce combustion products having a desired composition. The combustor apparatus 220 may also include a combustion chamber 222, configured as a high pressure, high temperature combustion volume, for receiving the fuel stream, as well as a transpiration fluid 210 entering the combustion volume through the walls of a porous transpiration member 230 defining the combustion chamber 222. The feed rate of the transpiration fluid 210 may be used to control the combustor apparatus outlet portion/turbine inlet portion temperature to a desired value and/or to cool the transpiration member 230 to a temperature compatible with the material forming the transpiration member 230. The transpiration fluid 210 directed through the transpiration member 230 provides a fluid/buffer layer at the surface of the transpiration member 230 defining the combustion chamber 222, wherein the fluid/buffer layer may prevent particles of ash or liquid slag resulting from certain fuel combustion from interacting with the exposed walls of the transpiration member 230.

Aspects of a high efficiency combustor apparatus may also be configured to operate with a variety of fuel sources including, for example, various grades and types of coal, wood, oil, fuel oil, natural gas, coal-based fuel gas, tar from tar sands, bitumen, bio-fuel, biomass, algae, and graded combustible solid waste refuse. Particularly, a coal powder or particulate solid can be used. Though an exemplary coal burning combustor apparatus 220 is disclosed herein, one skilled in the art will appreciate that the fuel used in the combustor apparatus 220 is not limited to a specific grade of coal. Moreover, because of the high pressures and high temperatures maintained by the oxygen-fueled combustor apparatus disclosed herein, a wide variety of fuel types may be implemented, including coal, bitumen (including bitumen derived from tar sands), tar, asphalt, used tires, fuel oil, diesel, gasoline, jet fuel (JP-5, JP-4), natural gas, gases derived from the gasification or pyrolysis of hydro-carbonaceous material, ethanol, solid and liquid biofuels, biomass, algae, and processed solid refuse or waste. All such fuels are suitably processed to allow for injection into the combustion chamber 222 at sufficient rates and at pressures above the pressure within the combustion chamber 222. Such fuels may be in liquid, slurry, gel, or paste form with appropriate fluidity and viscosity at ambient temperatures or at elevated temperatures (e.g., between about 38° C. and about 425° C.). Any solid fuel materials are ground or shredded or otherwise processed to reduce particles sizes, as appropriate. A fluidization or slurrying medium can be added, as necessary, to achieve a suitable form and to meet flow requirements for high pressure pumping. Of course, a fluidization medium may not be needed depending upon the form of the fuel (i.e., liquid or gas). Likewise, the circulated working fluid may be used as the fluidization medium, in some aspects.

In some aspects, the combustion chamber 222 is configured to sustain a combustion temperature of between about 1,300° C. and about 5,000° C. The combustion chamber 222 may further be configured such that the fuel stream (and the working fluid 236) can be injected or otherwise introduced into the combustion chamber 222 at a pressure greater than the pressure at which combustion occurs. Where a coal particulate is the carbonaceous fuel, the coal particles can be slurried in a supercritical $CO_2$ fluid or water, formed by mixing liquid $CO_2$ or water with the ground solid fuel to form a pumpable slurry. In such instances, the liquid $CO_2$ can have a density, for example, in the range of between about 450 kg/m$^3$ and about 1100 kg/m$^3$ and the mass fraction of solid fuel can be in the range of between about 25% and about 95% (e.g., between about 25 weight % and about 55 weight %). Optionally, a quantity of $O_2$ can be mixed with the coal/$CO_2$ slurry sufficient to combust the coal to produce a desired composition of the combustion products. Optionally, the $O_2$ can be separately injected into the combustion chamber 222. The combustor apparatus 220 may include a pressure containment member 338 at least partially surrounding the transpiration member 230 defining the combustion chamber 230, wherein an insulating member 339 can be disposed between the pressure containment member 338 and the transpiration member 230. In some instances, a heat removal device 350, such as a jacketed water cooling system defining water-circulating jackets 337, may be engaged with the pressure containment member 338 (i.e., externally to the pressure containment member 338 forming the "shell" of the combustor apparatus 220). The transpiration fluid 210 implemented in connection with the transpiration member 230 of the combustor apparatus 220 can be, for example, $CO_2$ mixed with minor quantities of $H_2O$ and/or an inert gas, such as $N_2$ or argon. The transpiration member 230 may comprise, for example, a porous metal, a ceramic, a composite matrix, a layered manifold, any other suitable structure, or combinations thereof. In some aspects, the combustion within the combustion chamber 222 can produce a high pressure, high temperature exit fluid stream, which may be subsequently directed to a power-producing apparatus, such as a turbine, for expansion in relation thereto.

With respect to the apparatus aspects illustrated in FIG. 1, the combustor apparatus 220 may be configured to receive the oxygen 242 at a pressure of about 355 bar. Further, the particulate solid fuel (e.g., powdered coal) 254, and the fluidization fluid (e.g., liquid $CO_2$) 255 may also be received at a pressure of about 355 bar. Likewise, the working fluid (e.g., heated, high pressure, possibly recycled, $CO_2$ fluid) 236 may be provided at a pressure of about 355 bar, and a temperature of about 835° C. According to aspects of the present disclosure, however, the fuel mixture (fuel, fluidization fluid, oxygen, and working fluid) may be received in the inlet portion 222A of the combustion chamber 222 at a pressure of between about 40 bar and about 500 bar. The relatively high pressures implemented by aspects of the combustor apparatus 220, as disclosed herein, may function to concentrate the energy produced thereby to a relatively high intensity in a minimal volume, essentially resulting in a relatively high energy density. The relatively high energy density allows downstream processing of this energy to be performed in a more efficient manner than at lower pressures, and thus provides a viability factor for the technology.

Aspects of the present disclosure may thus provide an energy density at orders of magnitude greater than existing power plants (i.e., by 10-100 fold). The higher energy density increases the efficiency of the process, but also reduces the cost of the equipment needed to implement the energy transformation from thermal energy to electricity, by reducing the size and mass of the equipment, thus the cost of the equipment.

When implemented, the $CO_2$ fluidization fluid 255, which is a liquid at any pressure between the $CO_2$ triple point pressure and the $CO_2$ critical pressure, is mixed with the powdered coal fuel 254 to form a mixture in the proportion of about 55% $CO_2$ and about 45% powdered coal by mass or other mass fraction, such that the resulting slurry can be pumped by a suitable pump (as a fluid slurry) to the combustion chamber 222 at the noted pressure of about 355 bar. In some aspects, the $CO_2$ and powdered coal may be mixed, prior to pumping, at a pressure of about 13 bar. The $O_2$ stream 242 is mixed with the recycle $CO_2$ working fluid stream 236 and that combination then mixed with the powdered coal/$CO_2$ slurry to form a single fluid mixture. The proportion of $O_2$ to coal may be selected to be sufficient to completely combust the coal with an additional 1% of excess $O_2$. In another aspect, the quantity of $O_2$ can be selected so as to allow a portion of the coal to be substantially completely oxidized, while another portion is only partially oxidized, resulting in a fluid mixture which is reducing and which includes some $H_2$+CO+$CH_4$. In such a manner, a two stage expansion of the combustion products may be implemented, as necessary or desired, with some $O_2$ injection and reheating between the first and second stages. Further, since the fuel (coal) is only partially oxidized in the first stage (i.e., a first combustion chamber at a temperature of between about 400° C. and about 1000° C.), any incombustible elements in the carbonaceous fuel exiting the first stage are formed as solid particulates within the combustion products. Upon filtration of the solid particulates, for example, by vortex and/or candle filters, the carbonaceous fuel may then be substantially completely oxidized in second stage (i.e., a second combustion chamber) so as to produce a final combustion product temperature of between about 1300° C. and about 3500° C.

In further aspects, the quantity of $CO_2$ present in the combustion chamber 222 via the fuel mixture is selected to be sufficient to achieve a combustion temperature (adiabatic or otherwise) of about 2400° C., though the combustion temperature can be in the range of between about 1300° C. and about 5000° C. The fuel mixture of $O_2$+coal slurry+heated recycle $CO_2$ is provided, in one aspect, at a resultant temperature below the auto-ignition temperature of that fuel mixture. In order to achieve the indicated conditions, the solid carbonaceous fuel (e.g., coal) is preferably provided at an average particle size of between about 50 microns and about 200 microns, for example, by grinding the solid coal in a coal mill. Such a grinding process may be performed in a mill configured to provide a minimal mass fraction of particles below about 50 microns. In this manner, any incombustible elements therein that are liquefied to form the liquid slag droplets in the combustion process may be greater than about 10 microns in diameter. In some aspects, the fuel mixture comprising the $CO_2$+$O_2$+powdered coal slurry, at a temperature of about 400° C., may be directed into the combustion chamber 222 at a pressure of about 355 bar, wherein the net pressure at combustion within the combustion chamber 222 may be about 354 bar. The temperature within the combustion chamber 222 can range from between about 1300° C. and about 5000° C., and in some preferred aspects, only a single combustion stage is implemented.

In one example of a combustor apparatus 220, as disclosed herein, a 500 MW net electrical power system may be configured to operate with $CH_4$ fuel at an efficiency (lower heating value basis) of about 58%, at the following conditions:

Combustion pressure: 350 atm
Fuel input: 862 MW
Fuel flow: 17.2 kg/second
Oxygen flow: 69.5 kg/second The $CH_4$ and $O_2$ are mixed with 155 kg/second of $CO_2$ working fluid and combusted to produce a exit fluid stream comprising $CO_2$, $H_2O$ and some excess $O_2$ at an adiabatic temperature of 2400° C. The combustion chamber may have an internal diameter of about 1 m and a length of about 5 m. A flow of 395 kg/second of $CO_2$ at a temperature of about 600° C. is directed toward the transpiration member, which may be about 2.5 cm thick, and is directed through the transpiration member. This $CO_2$ is heated convectively from heat conducted through the transpiration member which originates from radiation of the combustion within the combustion chamber to the transpiration member.

About the inner surface thereof defining the combustion chamber, the transpiration member surface temperature may be about 1000° C., while the exit fluid stream of 636.7 kg/second may be at a temperature of about 1350° C. In such instances, the average residence time for combustion and dilution of the combustion products is about 1.25 seconds. Further, the average radially inward velocity for the transpiration fluid entering the combustion chamber through the transpiration member is approximately 0.15 m/s.

Amending the example for a coal-fueled combustor apparatus results in a configuration with an average residence time for combustion and dilution of the combustion products in the combustion chamber of about 2.0 seconds, and a combustion chamber length of about 8 m, with an internal diameter of about 1 m. The net efficiency of the system with $CO_2$ as the dilution (transpiration) fluid is thus about 54% (lower heating value basis). In such instances, the transpiration fluid radially inward velocity may be about 0.07 m/s. Under such conditions, FIG. 5 shows a schematic trajectory of a 50 micron diameter liquid slag particle projected radially outward at about 50 m/s toward the transpiration member from a distance of 1 mm therefrom. As illustrated, the particle would reach a minimum 0.19 mm from the transpiration member before being carried back into the exit fluid flow stream by the transpiration fluid flow through the transpiration member. In such instances, the transpiration fluid flow through the transpiration member effectively buffers interaction between the transpiration member and liquid slag particles resulting from the combustion process.

Aspects of the disclosed combustor apparatus may be implemented in suitable power production systems using associated methods, as will be appreciated by one skilled in the art. For example, such a power production system may comprise one or more injectors for providing fuel (and optionally a fluidizing medium), an oxidant, and a $CO_2$ working fluid; a transpiration-cooled combustor apparatus, as disclosed herein, having at least one combustion stage for combusting the fuel mixture, and provides an exit fluid stream. A transformation apparatus (see, e.g., element 500 in FIG. 6) may be configured to receive the exit fluid stream (combustion products and working fluid), and to be responsive to the exit fluid stream to transform energy associated therewith into kinetic energy, wherein the transformation apparatus may be, for example, a power production turbine having an inlet and an outlet and wherein power is produced as the exit fluid stream expands. More particularly, the turbine may be configured to maintain the exit fluid stream at a desired pressure ratio between the inlet and the outlet. A generator device (see, e.g., element 550 in FIG. 6) may also be provided to transform the kinetic energy of the turbine into electricity. That is, the exit fluid stream may be expanded from a high pressure to a lower pressure to produce shaft power which can then be converted to electric power. A heat exchanger may be provided for cooling the exit fluid stream from the turbine outlet and for heating the $CO_2$ working fluid entering the combustor apparatus. One or more devices may also be provided for separating the exit fluid stream leaving the heat exchanger into pure $CO_2$ and one or more further components for recovery or disposal. Such a system may also comprise one or more devices for compressing the purified $CO_2$ and for delivering at least a portion of the $CO_2$ separated from the exit fluid stream into a pressurized pipeline, while the remaining portion is recycled as the working fluid which is heated by the heat exchanger. One skilled in the art, however, will appreciate that, though the present disclosure involves direct implementation of the exit fluid stream, in some instances, the relatively high temperature exit fluid stream may be implemented indirectly. That is, the exit fluid stream may be directed to a heat exchanger, wherein the thermal energy associated therewith is used to heat a second working fluid stream, and the heated second fluid working stream then directed to a transformation device (e.g., a turbine) to generate power. Further, one skilled in the art will appreciate that many other such arrangements may be within the scope of the present disclosure.

In particular aspects of the disclosure, the composition of the carbonaceous fuel is such that incombustible elements (i.e., contaminants) may be included therein, and remain present in the combustion products/exit fluid stream following the combustion process. Such may be the case where the carbonaceous fuel is a solid such as coal. In those aspects, direct implementation of the exit fluid stream may result in build-up of such incombustible elements on or other damage to the subsequent transformation apparatus (turbine) if the exit fluid stream is channeled directly thereto. One skilled in the art will also appreciate that such incombustible elements may not necessarily be present when implementing other forms of carbonaceous fuel such as a liquid or gas (i.e., natural gas). Accordingly, in aspects implementing a solid carbonaceous fuel source and a direct interaction between the exit fluid stream and the transformation apparatus, the power system (combustor apparatus and transformation apparatus) may further include a separator apparatus disposed between the combustor apparatus and the transformation apparatus. In such instances, the separator apparatus may be configured to substantially remove liquefied incombustible elements from the combustion products/exit fluid stream received thereby, prior to the combustion products/exit fluid stream being directed to the transformation apparatus. Further, in aspects implementing a separator apparatus, the disclosed transpiration substance may be introduced both upstream and downstream of the separator apparatus. More particularly, the transpiration substance may be first introduced into the combustion chamber, via the transpiration member and upstream of the separator apparatus, so as to regulate a mixture of the transpiration substance and the combustion products entering the separator apparatus above a liquification temperature of the incombustible elements. Subsequent to the separator apparatus, a transpiration substance delivery device (see, e.g., element 475 in FIG. 6) may be configured to deliver the transpiration substance to the combustion products exiting the separator apparatus, and having the liquefied incombustible elements substantially removed therefrom, so as to regulate a mixture of the transpiration substance and the combustion products entering the transformation apparatus at a temperature of between about 400° C. and about 3500° C.

As previously discussed, aspects of the combustor apparatus may include the capability of achieving a combustion temperature which causes the incombustible elements in the solid carbonaceous fuel to be liquefied during the combustion process. In such instances, provisions for removing the liquefied incombustible elements may be applied such as, for example, a separator apparatus 340 such as a cyclonic separator, as shown in FIG. 4. Generally, aspects of such a cyclonic separator implemented by the present disclosure may comprise a plurality of serially-arranged centrifugal separator devices 100, including an inlet centrifugal separator device 100A configured to receive the combustion products/exit fluid stream and the liquefied incombustible elements associated therewith, and an outlet centrifugal separator device 100B configured to exhaust the combustion products/exit fluid stream having the liquefied incombustible elements substantially removed therefrom. Each centrifugal separator device 100 includes a plurality of centrifugal separator elements or cyclones 1 operably arranged in parallel about a central collector pipe 2, wherein each centrifugal separation element/cyclone 2 is configured to remove at least a portion of the liquefied incombustible elements from the combustion products/exit fluid stream, and to direct the removed portion of the liquefied incombustible elements to a sump 20. Such a separator apparatus 340 may be configured to operate at an elevated pressure and, as such, may further comprise a pressure-containing housing 125 configured to house the centrifugal separator devices and the sump. According to such aspects, the pressure-containing housing 125 may be an extension of the pressure containment member 338 also surrounding the combustor apparatus 220, or the pressure-containing housing 125 may be a separate member capable of engaging the pressure containment member 338 associated with the combustor apparatus 220. In either instance, due to the elevated temperature experienced by the separator apparatus 340 via the exit fluid stream, the pressure-containing housing 125 may also include a heat-dispersion system, such as a heat transfer jacket having a liquid circulated therein (not shown), operably engaged therewith for removing heat therefrom. In some aspects, a heat recovery device (not shown) may be operably engaged with the heat transfer jacket, wherein the heat recovery device may be configured to receive the liquid circulated in the heat transfer jacket and to recover thermal energy from that liquid.

More particularly, the (slag removal) separator apparatus 340, shown in FIG. 4, is configured to be serially disposed with the combustor apparatus 220 about the outlet portion 222B thereof for receiving the exit fluid stream/combustion products therefrom. The transpiration-cooled exit fluid stream from the combustor apparatus 220, with the liquid slag (incombustible elements) droplets therein, is directed to enter a central collector provision 2A of the inlet centrifugal separator device 100A via a conical reducer 10. In one aspect, the separator apparatus 340 may include three centrifugal separator devices 100A, 100B, 100C (though one skilled in the art will appreciate that such a separator apparatus may include one, two, three, or more centrifugal separator devices, as necessary or desired). In this instance, the three centrifugal separator devices 100A, 100B, 100C operably arranged in series provides a 3 stage cyclonic separation unit. Each centrifugal separator device includes, for example, a plurality of centrifugal separator elements (cyclones 1) arranged about the circumference of the corresponding central collector pipe 2. The central collector provisions 2A and the central collector pipes 2 of the inlet centrifugal separator device 100A, and the medial centrifugal separator device 100C are each sealed at the outlet end thereof. In those instances, the exit fluid stream is directed into branch channels 11 corresponding to each of the centrifugal separator elements (cyclones 1) of the respective centrifugal separator device 100. The branch channels 11 are configured to engage the inlet end of the respective cyclone 1 to form a tangential inlet therefor (which causes, for instance, the exit fluid stream entering the cyclone 1 to interact with the wall of the cyclone 1 in a spiral flow). The outlet channel 3 from each cyclone 1 is then routed into the inlet portion of the central collector pipe 2 of the respective centrifugal separator device 100. At the outlet centrifugal separator device 100B, the exit fluid stream (having the incombustible elements substantially separated therefrom) is directed from the central collector pipe of the outlet centrifugal separator device 100B and via a collector pipe 12 and an outlet nozzle 5, such that the "clean" exit fluid stream can then be directed to a subsequent process, such as that associated with the transformation apparatus. The exemplary three stage cyclonic separation arrangement thus allows removal of slag down to, for example, below 5 ppm by mass in the exit fluid stream.

At each stage of the separator apparatus 340, the separated liquid slag is directed from each of the cyclones 1 via outlet tubes 4 which extend toward a sump 20. The separated liquid slag is then directed into an outlet nozzle or pipe 14 extending from the sump 20 and the pressure-containing housing 125 for removal and/or recovery of components therefrom. In accomplishing the removal of the slag, the liquid slag may be directed though a water-cooled section 6 or otherwise through a section having a high pressure, cold water connection, wherein interaction with the water causes the liquid slag to solidify and/or granulate. The mixture of solidified slag and water may then be separated in a vessel (collection provision) 7 into a slag/water fluid mixture which can be removed through a suitable valve 9, while any residual gas may be removed via a separate line 8.

Since the separator apparatus 340 is implemented in conjunction with the relatively high temperature exit fluid stream (i.e., at a temperature sufficient to maintain the incombustible elements in liquid form with a relatively low viscosity), it may be desirable, in some instances, that surfaces of the separator apparatus 340 exposed to one of the combustion products/exit fluid stream and the liquefied incombustible elements associated therewith be comprised of a material configured to have at least one of a high temperature resistance, a high corrosion resistance, and a low thermal conductivity. Examples of such materials may include zirconium oxide and aluminum oxide, though such examples are not intended to be limiting in any manner. As such, in certain aspects, the separator apparatus 340 is configured to substantially remove the liquefied incombustible elements from the combustion products/exit fluid stream and to maintain the incombustible elements in a low viscosity liquid form at least until removal thereof from the sump 20.

As such, as disclosed herein, the slag separation in instances of a solid carbonaceous fuel may be accomplished in a single unit (separator apparatus 340) which may, in some instances, be readily extracted from the system for maintenance and inspection. However, such an aspect may provide further advantages, as shown in FIG. 6, whereby the system may be readily configured to implement a "flex fuel" approach in operation with respect to the availability of a particular fuel source. For example, the single unit separator apparatus 340 may be installed in the system, between the combustor apparatus 220 and the transformation apparatus (turbine) 500, when the combustor apparatus 220 used a solid carbonaceous fuel as the fuel source. Should it be desirable to change to a liquid or gas carbonaceous fuel source, the separator unit 340 may be removed from the system (i.e., may not be necessary, as previously discussed) such that the exit fluid stream from the combustor apparatus 220 can be directed directly to the transformation apparatus 500. The system may thus also be readily changed back to implement the separator unit 340 should the fuel availability later dictate a solid carbonaceous fuel source.

Many modifications and other aspects of the disclosure set forth herein will come to mind to one skilled in the art to which this disclosure pertains having the benefit of the teachings presented in the foregoing descriptions and the associated drawings. For example, in some aspects, only a portion of the total flow of the transpiration substance/fluid 210 to and through the inner transpiration member 332 and into the combustion chamber 222, may be necessary to provide the helical flow of the transpiration fluid within the combustion chamber 222. In one instance, for example, up to about 90% of the total mass flow of transpiration fluid 210 entering the combustion chamber 222 may be implemented to provide or induce the helical flow, while maintaining sufficient radial flow of the transpiration fluid 210 into the combustion chamber 222 to prevent solid or liquid particles or contaminants from impinging upon the walls of the inner transpiration member 332 defining the combustion chamber 222.

Further, in some aspects, the combustor apparatus 220 may be configured and arranged as a partial oxidation device, for example, using the solid fuel (i.e., coal) slurry. In such instances, the partial oxidation combustor apparatus 220 may be configured to have an operating temperature, for example, up to about 1600° C. or, in other instances, in the range of between about 1400° C. and about 1500° C., wherein carbon burnout in the fuel should be below about 2% and, preferably, below 1%. In these instances, the relatively lower operating temperature facilitates production of $H_2$ and CO by minimizing combustion thereof, while facilitating a relatively high carbon conversion rate and usable heat.

In other aspects, the combustor apparatus 220 may be configured to operate at a relatively high exit temperature of about 5000° C. or more, which may be associated, for example, with an adiabatic flame temperature or other temperature sufficient to facilitate dissociation of the product gases. For example, $CO_2$ dissociates significantly above about 1600° C.

In yet other aspects, the burner device 300 may be configured and arranged such that there is no premixing of the carbonaceous fuel and the diffusing $CO_2$ component upstream thereof. In addition, $O_2$ may also be introduced at the burner tip, for instance through a separate set of nozzles or with a concentric annular ring surrounding the injection nozzle(s). In such instances, a diffusion flame may be achievable for carbonaceous fuels with a high $H_2$ content. To achieve very high temperatures at the burner device 300, preheating of the fuel, oxygen, and/or any diluents may also be required.

Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. An apparatus, comprising:
    a mixing arrangement configured to mix a carbonaceous fuel with enriched oxygen and a working fluid to form a fuel mixture; and
    a combustor arrangement defining a combustion chamber having an inlet portion longitudinally spaced apart from an opposing outlet portion, the inlet portion being configured to receive the fuel mixture for combustion within the combustion chamber at a combustion temperature to form a combustion product, the combustion chamber being further configured to direct the combustion product longitudinally toward the outlet portion, the combustor arrangement comprising:
    a pressure containment member;
    a porous perimetric transpiration member at least partially defining the combustion chamber, and being at least partially surrounded by the pressure containment member, the porous transpiration member being configured to direct a transpiration substance therethrough toward and into the combustion chamber, substantially uniformly about the perimeter thereof, such that the transpiration substance is directed substantially tangential to the perimeter of the porous transpiration member, and to flow helically about the perimeter thereof and longitudinally between the inlet portion and the outlet portion, to buffer interaction between the combustion product and the porous transpiration member; and
    a burner device configured to receive the fuel mixture from the mixing arrangement and to direct the fuel mixture into the inlet portion of the combustion chamber in a direction opposite to the helical flow of the transpiration substance,
    wherein the working fluid and the transpiration substance comprise supercritical carbon dioxide.

2. An apparatus according to claim 1, wherein the mixing arrangement is further configured to mix one of a solid carbonaceous fuel, a liquid carbonaceous fuel, and a gaseous carbonaceous fuel with the enriched oxygen, comprising oxygen having a molar purity of greater than about 85%, and the working fluid.

3. An apparatus according to claim 1, wherein the carbonaceous fuel is a particulate solid having an average particle size of between about 50 microns and about 200 microns, and the mixing arrangement is further configured to mix the particulate solid carbonaceous fuel with a fluidizing substance, the fluidizing substance comprising one of water and liquid $CO_2$ having a density of between about 450 kg/m$^3$ and about 1100 kg/m$^3$, the fluidizing substance cooperating with the particulate solid carbonaceous fuel to form a slurry having between about 25 weight % and about 95 weight % of the particulate solid carbonaceous fuel.

4. An apparatus according to claim 1, wherein the combustion chamber is further configured to receive the fuel mixture in the inlet portion thereof at a pressure of between about 40 bar and about 500 bar.

5. An apparatus according to claim 1, wherein the combustion temperature is between about 1300° C. and about 5000° C., and is configured such that incombustible contaminants in the carbonaceous fuel are liquefied within the combustion product.

6. An apparatus according to claim 1, wherein the transpiration substance is configured to be introduced into the combustion chamber via the porous transpiration member so as to regulate an exit mixture of the transpiration substance and the combustion product about the outlet portion of the combustion chamber at a temperature of between about 400° C. and about 3500° C.

7. An apparatus according to claim 6, wherein the transpiration substance is directed through the porous transpiration member such that the transpiration substance forms a buffer layer immediately adjacent to the porous transpiration member within the combustion chamber, the buffer layer being configured to buffer interaction between the porous transpiration member and liquefied incombustible contaminants and heat associated with the combustion product.

8. An apparatus according to claim 1, wherein the porous transpiration member is configured to impart a Coanda effect on the transpiration substance directed therethrough and into the combustion chamber, so as to direct the transpiration substance to flow substantially tangential to the perimeter of the porous transpiration member.

9. An apparatus according to claim 1, wherein the porous transpiration member further includes at least one transpiration port extending therethrough, the at least one transpiration port being configured to direct a supplemental linear flow of the transpiration substance into one of the fuel mixture and the combustion product so as to affect flow characteristics thereof.

10. An apparatus according to claim 1, further comprising a heat removal device associated with the pressure containment member and configured to control a temperature thereof, the heat removal device comprising a heat transfer jacket having a liquid circulated therein.

11. An apparatus according to claim 1, wherein the porous transpiration member is further configured to define pores, the porous transpiration member further having a cumulative pore area substantially equal to a surface area of the porous transpiration member defining the pores.

12. An apparatus according to claim 11, wherein the pores are spaced apart and substantially uniformly distributed about the porous transpiration member and between the inlet and outlet portions thereof.

13. An apparatus according to claim 1, further comprising a transformation apparatus configured to receive the combustion product from the outlet portion of the combustion chamber, the transformation apparatus being responsive to the combustion product to transform energy associated therewith into kinetic energy.

14. An apparatus according to claim 13, wherein the carbonaceous fuel is a solid, and the apparatus further comprises a separator apparatus disposed between the combustor arrangement and the transformation apparatus, the separator apparatus being configured to substantially remove liquefied incombustible contaminants from the combustion product received thereby prior to the combustion product being directed to the transformation apparatus.

15. An apparatus according to claim 14, wherein the transpiration substance is configured to be introduced into the combustion chamber via the porous transpiration member so as to regulate a mixture of the transpiration substance and the combustion product entering the separator apparatus above a liquification temperature of the incombustible contaminants.

16. An apparatus according to claim 15, further comprising a transpiration substance delivery device disposed subsequently to the separator apparatus and configured to deliver the transpiration substance to the combustion product having the liquefied incombustible contaminants substantially removed therefrom so as to regulate a mixture of the transpiration substance and the combustion product entering the transformation apparatus at a temperature of between about 400° C. and about 3500° C.

17. An apparatus according to claim 14, wherein the separator apparatus further comprises a plurality of serially arranged centrifugal separator devices, each centrifugal separator device having a plurality of centrifugal separator elements operably arranged in parallel, and wherein the liquefied incombustible contaminants removed from the combustion product by the separator apparatus are removably collected in a sump associated with the separator apparatus.

18. An apparatus according to claim 13, wherein the transformation apparatus comprises one of a turbine device configured to be responsive to the combustion product so as to transform the energy associated therewith into kinetic energy, and a generator device configured to transform the kinetic energy into electricity.

19. An apparatus according to claim 1, wherein the transpiration substance is also supplied to the mixing arrangement as the working fluid.

20. An apparatus according to claim 1, further comprising at least one transpiration substance source configured to supply the transpiration substance to at least one of the mixing arrangement as the working fluid and the transpiration member as the transpiration substance.

21. An apparatus, comprising:
a mixing arrangement configured to mix a carbonaceous fuel with enriched oxygen and a working fluid to form a fuel mixture; and
a combustor arrangement defining a combustion chamber having an inlet portion longitudinally spaced apart from an opposing outlet portion, the inlet portion being configured to receive the fuel mixture for combustion within the combustion chamber at a combustion temperature to form a combustion product, the combustion chamber being further configured to direct the combustion product longitudinally toward the outlet portion, the combustor arrangement comprising:
a pressure containment member;
a porous perimetric transpiration member at least partially defining the combustion chamber, and being at least partially surrounded by the pressure containment member, the porous transpiration member being configured to direct a transpiration substance therethrough toward and into the combustion chamber, substantially uniformly about the perimeter thereof, such that the transpiration substance is directed substantially tangential to the perimeter of the porous transpiration member, and to flow helically about the perimeter thereof and longitudinally between the inlet portion and the outlet portion, to buffer interaction between the combustion product and the porous transpiration member; and
a burner device configured to receive the fuel mixture from the mixing arrangement and to direct a substantially uniform linear flow of the fuel mixture into the inlet portion of the combustion chamber, wherein the helical flow of the transpiration substance is configured to induce swirl of the fuel mixture within the combustion chamber.

22. An apparatus according to claim 21, wherein the combustion chamber includes a combustion section disposed toward the inlet portion and a post-combustion section disposed toward the outlet portion, and wherein the porous transpiration member is configured such that the helical flow of the transpiration substance over the post-combustion section is opposite to the helical flow of the transpiration substance over the combustion section so as to reverse the induced swirl of the combustion product in the post-combustion section with respect to the induced swirl of the fuel mixture in the combustion section.

23. An apparatus according to claim 21, wherein the porous transpiration member is configured such that the helical flow of the transpiration substance is alternatingly reversed along at least a section thereof so as to alternately reverse the induced swirl of one of the fuel mixture and the combustion product between the inlet portion and the outlet portion.

* * * * *